US009460363B2

(12) United States Patent
Zhang et al.

(10) Patent No.: US 9,460,363 B2
(45) Date of Patent: Oct. 4, 2016

(54) METHOD FOR ESTIMATING ROTATION AXIS AND MASS CENTER OF SPATIAL TARGET BASED ON BINOCULAR OPTICAL FLOWS

(71) Applicant: Huazhong University of Science and Technology, Wuhan (CN)

(72) Inventors: Tianxu Zhang, Wuhan (CN); Sufei Fan, Wuhan (CN); Yimeng Chen, Wuhan (CN); Yayun Zheng, Wuhan (CN); Changsheng Chen, Wuhan (CN); Zheng Wang, Wuhan (CN); Huan Wu, Wuhan (CN); Xudong He, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 30 days.

(21) Appl. No.: 14/711,755

(22) Filed: May 13, 2015

(65) Prior Publication Data
US 2015/0242700 A1   Aug. 27, 2015

Related U.S. Application Data

(63) Continuation-in-part of application No. PCT/CN2014/085886, filed on Sep. 4, 2014.

(30) Foreign Application Priority Data

Dec. 26, 2013  (CN) .......................... 2013 1 0736940

(51) Int. Cl.
| G06K 9/00 | (2006.01) |
| G06K 9/46 | (2006.01) |
| G06K 9/48 | (2006.01) |
| G06T 7/00 | (2006.01) |
| G06T 7/20 | (2006.01) |
| G06T 7/60 | (2006.01) |

(52) U.S. Cl.
CPC ............ *G06K 9/4604* (2013.01); *G06K 9/481* (2013.01); *G06T 7/0075* (2013.01); *G06T 7/2066* (2013.01); *G06T 7/606* (2013.01); *G06T 2200/04* (2013.01); *G06T 2207/10012* (2013.01);

(Continued)

(58) Field of Classification Search
USPC ......................................................... 382/154
See application file for complete search history.

(56) References Cited

U.S. PATENT DOCUMENTS 4,965,840 A * 10/1990 Subbarao ............... G01C 3/085
356/12
5,535,302 A * 7/1996 Tsao ..................... G06K 9/4619
348/699

(Continued)

*Primary Examiner* — John Strege
(74) *Attorney, Agent, or Firm* — Matthias Scholl, PC; Matthias Scholl

(57) ABSTRACT

A method for estimating a rotation axis and a mass center of a spatial target based on binocular optical flows. The method includes: extracting feature points from binocular image sequences sequentially and respectively, and calculating binocular optical flows formed thereby; removing areas ineffective for reconstructing a three-dimensional movement trajectory from the binocular optical flows of the feature points, whereby obtaining effective area-constrained binocular optical flows, and reconstructing a three-dimensional movement trajectory of a spatial target; and removing areas with comparatively large errors in reconstructing three-dimensional motion vectors from the optical flows by multiple iterations, estimating a rotation axis according to a three-dimensional motion vector sequence of each of the feature points obtained thereby, obtaining a spatial equation of an estimated rotation axis by weighted average of estimated results of the feature points, and obtaining spatial coordinates of a mass center of the target according to two estimated rotation axes.

7 Claims, 15 Drawing Sheets

(52) U.S. Cl.
CPC ............... *G06T2207/10021* (2013.01); *G06T 2207/30241* (2013.01)

(56) References Cited

U.S. PATENT DOCUMENTS

| | | | | |
|---|---|---|---|---|
| 5,911,035 A * | 6/1999 | Tsao | ..................... | G06T 7/0075 382/107 |
| 2011/0243390 A1 * | 10/2011 | Eggert | .................. | G06T 7/2066 382/107 |
| 2012/0218427 A1 * | 8/2012 | Wu | .................... | H04N 5/23267 348/208.6 |
| 2012/0219174 A1 * | 8/2012 | Wu | .................... | G06K 9/00711 382/103 |
| 2014/0002441 A1 * | 1/2014 | Hung | .................... | G06T 7/0075 345/419 |

* cited by examiner

METHOD FOR ESTIMATING ROTATION AXIS AND MASS CENTER OF SPATIAL TARGET BASED ON BINOCULAR OPTICAL FLOWS

CROSS-REFERENCE TO RELATED APPLICATIONS

This application is a continuation-in-part of International Patent Application No. PCT/CN2014/085886 with an international filing date of Sep. 4, 2014, designating the United States, now pending, and further claims priority benefits to Chinese Patent Application No. 201310736940.2 filed Dec. 26, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a robust method for estimating a rotation axis and a mass center of a spatial target based on binocular optical flows.

2. Description of the Related Art

It is one of the basic tasks for computer vision to calculate information of structure, position and motion of a target in a three-dimensional space according to two-dimensional image information obtained by cameras, and to reconstruct, identify and track the target thereby, where trajectory of each of the feature points on surface of the spatial target corresponds to a corresponding feature point in each image of an image sequence. Detection, identification and tracking of a spatial target followed by motion analysis and attitude estimation thereby are required for spatial tasks such as space rendezvous and docking of spacecrafts, fly-around and accompanying flying of a dual-satellite formation, and accompanying flying and navigation of a multi-satellite formation. Therefore, vision systems and algorithms featuring in high accuracy, external information independence, and excellent perception of complex environments are in urgent need to reconstruct attitude and trajectory of a spatial target, and highly accurate quantitative measurement should be performed on structure, trajectory, spatial position, and three-dimensional attitude of the target. Image sequence-based analysis is an important method for obtaining the information, however, reconstruction methods in prior art are limited in many ways for existence of areas ineffective for reconstructing three-dimensional motion vectors in an optical flow in a reconstruction process by binocular optical flows as a result of discretization errors, and it is critical to improve accuracy and stability of detection, tracking and reconstruction of a spatial target. There is provided a robust method for estimating a rotation axis and a mass center of a spatial target based on binocular optical flows, which is capable of improving accuracy of tracking and reconstruction of a trajectory of a spatial target effectively and reconstructing motion information of the spatial target accurately.

Motion structure reconstruction is a theory and a method for research in obtaining information of structure, position and motion of a target in a scenario from image sequences of the scenario, which is widely used in fields of robot navigation, automotive intelligent transportation, non-contact measurement of an object, etc. In unknown environments, autonomous navigation, such as robot navigation, space satellite tracking formation, etc., has technical difficulties not only in avoiding stationary objects, but also in adapting to a changing environment, and tracking, detecting and avoiding moving objects. On many occasions, a vision system is required to track and detect unknown objects automatically, and to realize close observation of properties and relative navigation of the unknown target, where it is critical to estimate a relative position and a relative attitude between a vision system and a target, and establish a motion equation of relative navigation. Therefore, mass center or a rotation axis of a target should be estimated first.

Errors may exist in reconstruction process in a conventional method for estimating a rotation axis and a mass center of a spatial target based on binocular optical flows, which does not analyze reasons for the errors and does not provide a corresponding solution. However, the present invention analyzes the existing problems and provides a solution.

SUMMARY OF THE INVENTION

In view of the above-mentioned problems, it is an objective of the invention to provide a robust method for estimating a rotation axis and a mass center of a spatial target based on binocular optical flows under the condition of not knowing any prior information of a target, which obtains time-based image sequences of a scenario by binocular cameras, extracts feature points of a target in the scenario from the image sequences of the scenario, obtains binocular optical flows for each feature point, removing areas ineffective for reconstructing three-dimensional motion vectors form the binocular optical flows, obtains effective area-constrained binocular optical flows, reconstructs real three-dimensional motion vectors of the target by multiple iterations, and estimates a rotation axis and mass center of the target. Rotation of a spatial object may happen in the following two cases: a spin-stabilized satellite and an attitude adjusting satellite.

Assume an object rotates around two different axes in two different time periods $T_1$ and $T_2$. As both axes pass through mass center of the object according to dynamics law, mass center of the object may be obtained by estimating positions of the two axes and calculating an intersection point thereof. Specific steps are as follows:

(1) extracting feature points from a stereo image pair respectively;

(2) calculating binocular optical flows formed by feature points in image sequences sequentially;

(3) removing areas ineffective for reconstructing a three-dimensional movement trajectory from the binocular optical flows of the feature points thereby obtaining effective area-constrained binocular optical flows;

(4) reconstructing a three-dimensional movement trajectory of each of the feature points according to the effective area-constrained binocular optical flows thereof obtained in step (3);

(5) calculating a normal vector of a three-dimensional movement trajectory plane of each of the feature points, calculating a cosine distance between the normal vector of each of the feature points and a direction vector of each segment of the trajectory thereof sequentially, and removing a segment of the trajectory of each of the feature points with a maximum modulus of cosine distance;

(6) recalculating a normal vector of a trajectory plane of each of the feature points according to the residual trajectory thereof, calculating a cosine distance between the two normal vectors of each of the feature points, determining whether the cosine distance between the two normal vectors of each of the feature points is greater than a preset cosine distance threshold, and returning to step (5) and performing calculation according to the residual trajectory of each of the feature points if yes;

(7) estimating a trajectory plane of each of the feature points and center and radius of the trajectory thereof;

(8) performing weighted average on normal vectors of the trajectory planes and on centers of the trajectories respectively according to the radius of the trajectory of each of the feature points, whereby obtaining a spatial equation of a final rotation axis; and (9) repeating steps (1)-(8) when the rotation axis of the spatial target changes, whereby obtaining a spatial equation of a second rotation axis, and combining the spatial equation of the second rotation axis with that of the former rotation axis, whereby calculating coordinate of mass center of the spatial target.

The present invention provides a method for estimating a rotation axis and a mass center of a spatial target, which reconstructs trajectory of the spatial target accurately by using feature points obtained by detection algorithms for edges, lines and corners as optical flow tracking points without marking the spatial object. Optical flows are formed in a left camera and a right camera respectively during rotation of a target. The present invention extracts binocular optical flows effective for reconstructing three-dimensional motion vectors, reconstructs three-dimensional motion vectors for each of the feature points according to effective area-constrained binocular optical flows, fits out a three-dimensional movement trajectory for each of the feature points according to a series of three-dimensional motion vectors thereof, removes areas with comparatively large errors from optical flow trajectories by multiple iterations, and reconstructs a three-dimensional movement trajectory for each of the feature points fitted out by three-dimensional motion vectors thereof. As optical flows formed on imaging planes of two sensors are different for a feature point during rotation of an object, the present invention reconstructs three-dimensional motion vectors for each of the feature points according to the differences, fits out a three-dimensional movement trajectory for each of the feature points by a series of three-dimensional motion vectors thereof, performs weighted averaging on normal vectors of trajectory planes of the feature points and on centers of the trajectories thereof respectively, obtains a spatial equation of a rotation axis in a current spinning process, and estimates another rotation axis in another time period by the same method. As a rotation axis passes through mass center of a spinning object according to dynamics law, spatial coordinates of mass center of the object may be obtained by calculating an intersection point of two rotation axes in two time periods.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Related concepts and terminologies are illustrated first for better understanding of the present invention, comprising three coordinate systems in machine vision: image coordinate system (U,V), camera coordinate system and spatial coordinate system, where image data captured by machine vision are illustrated by an image coordinate system, namely row and column locations of pixels of an image, objective locations and sizes of measured objects and interrelations therebetween are illustrated by a spatial coordinate system, and the two coordinate systems are transformed by a camera coordinate system.

1. Image Coordinate System

Digital image captured by a camera can be stored as an array in a computer, where value of each element of the array represents brightness of an image point. Define a rectangular coordinate system U-V on an image, where coordinate of each pixel thereof (U, V) is represented by column number and row number of the pixel in the array. Therefore, (U, V) represents a coordinate of a pixel in the image coordinate system, where an origin O, a main point of the image, is defined as intersection of optical axis of the camera and the image plane.

2. Camera Coordinate System

Figure 2:
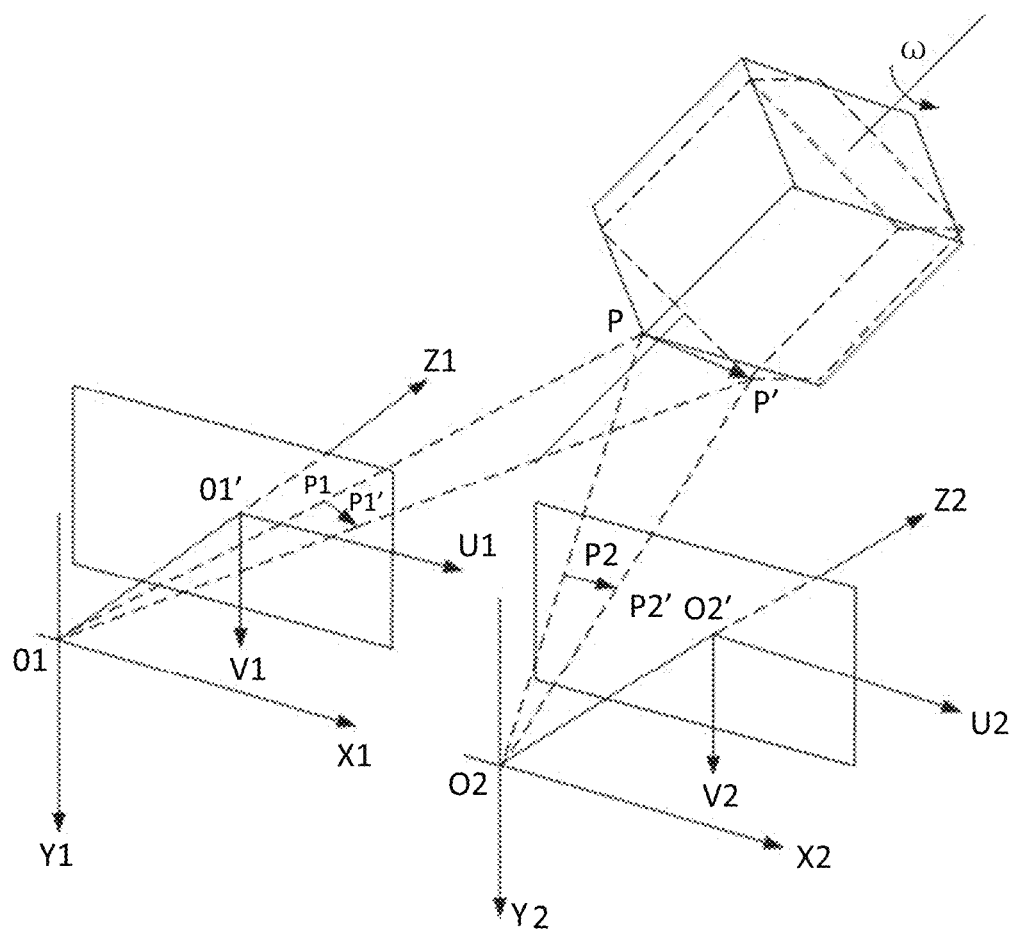
FIG. 2 illustrates a module of a three-dimensional motion vector being projected onto a binocular imaging system.

Geometric relationship of imaging by cameras is shown in FIG. 2, where O1 and O2 are optical centers of a left camera and a right camera respectively; axes X1 and Y1 are parallel with axes U1 and V1 of an imaging plane coordinate system respectively, axis Z1 is optical axis of the left camera and is perpendicular to the image plane, and intersection of the optical axis and the image plane is a main point of the image O1'; and axes X2 and Y2 are parallel with axes U2 and V2 of another imaging plane coordinate system respectively, axis Z2 is an optical axis of the right camera and is perpendicular to the image plane, and intersection of the optical axis and the image plane is a main point of the image O2'. A rectangular coordinate system formed by the point O1, and the axes X1, Y1 and Z1 is called as left camera coordinate system, where O1O1' is focal length of the left camera, and a rectangular coordinate system formed by the point O2, and the axes X2, Y2 and Z2 is called as right camera coordinate system, where O2O2' is focal length of the right camera.

3. Spatial Coordinate System

Spatial coordinate system is a reference coordinate system chosen to illustrate locations of cameras and objects in an environment. Relationship between a camera coordinate system and a spatial coordinate system may be illustrated by a rotation matrix and a translation vector. The left camera coordinate system is used as a spatial coordinate system hereafter.

Figure 1:
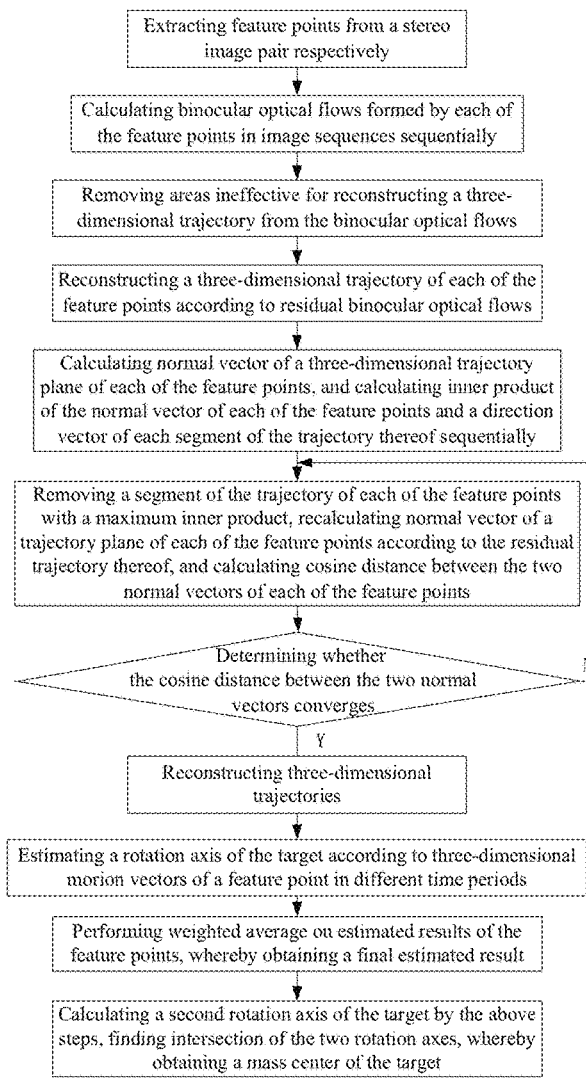
FIG. 1 is a flow chart of a method for estimating a rotation axis and a mass center of a spatial target according to the present invention.

In one embodiment of the present invention, a binocular stereo vision system formed by visible binocular cameras is used to capture a spinning target. An overall flow chart is shown in FIG. 1.

Feature points of a spatial target (such as corners, edge points, inflections, bright points in a dark area and dark points in a bright area) generate two-dimensional projections of a trajectory thereof on imaging planes of binocular cameras, and those two-dimensional projections of the three-dimensional movement trajectory on the imaging planes are called as optical flows, and optical flows formed on two cameras by a same feature point are called as optical flow stereo pair. The method of the present invention is to estimate trajectory of a spatial target accurately by optical flow stereo pairs formed on binocular cameras by multiple feature points of the spinning target.

(1) Extracting feature points from a stereo image pair respectively.

A spatial target is rich in surface structures containing a large number of point primitives and line primitives. For example, geometry of a star body may be a prism, a cube or an octahedron, and solar panels are generally cuboid. Many targets are formed by lines or curves, where line is one of the most basic geometric units for composing a target, and many artificial targets are composed by basic geometries such as cubes and columns formed by parallel lines and vertical lines. Feature points of a target can be detected by extracting edge information of the target by edge operators, and by detecting line segments according to Hough transform and calculating intersections of adjacent line segments. Harris corner detection algorithm or SUSAN corner detection algorithm can also be used as a supplementary means for corner detection of the target to improve accuracy of feature point detection.

(2) Calculating binocular optical flows formed by feature points in image sequences sequentially.

Generally, time-based image sequences of a scenario are obtained while rotating the target at a uniform speed, and feature points obtained by step (1) are used as optical flow tracking points. Binocular optical flows formed by feature points in image sequences are obtained by calculating feature points in each frame of the image sequences sequentially, where a comparatively large or small optical flow may be obtained by controlling the rotation speed, which may be adjusted according to a specific situation in practice.

(3) Removing areas ineffective for reconstructing a three-dimensional movement trajectory from the binocular optical flows of the feature points thereby obtaining effective area-constrained binocular optical flows.

Optical flows, generated by three-dimensional motion vectors projected onto imaging planes of two cameras, are unable to reconstruct three-dimensional motion vectors accurately and effectively or cause comparatively large loss of information in reconstruction at certain moments, which leads to comparatively large reconstruction errors, where local errors may seriously affect following analysis and estimation of movement of the target and corresponding areas are ineffective for reconstructing three-dimensional motion vectors. Therefore, optical flow segments ineffective for reconstructing three-dimensional motion vectors should be removed in reconstructing spatial trajectories of three-dimensional motion vectors, whereby obtaining effective area-constrained binocular optical flows.

As in FIG. 2, P is projection of a point P on an imaging plane of a left camera, $P'_1$ is projection of a point P' on an imaging plane of the left camera, and $\overrightarrow{P_1P'_1}$ is an optical flow generated by a three-dimensional motion vector $\overrightarrow{PP'}$ projected onto imaging plane of the left camera. Similarly, $\overrightarrow{P_2P'_2}$ is an optical flow generated by PP' projected onto imaging plane of a right camera.

In an imaging plane coordinate system $O'_1U_1V_1$ of the left camera, $(U_1,V_1)$ represent coordinate of $P_1$ and $(U'_1,V'_1)$ represent coordinate of $P'_1$. In an imaging plane coordinate system $O'_2U_2V_2$ of the right camera, $(U_2,V_2)$ represent coordinate of $P_2$ and $(U'_2,V'_2)$ represent coordinate of $P'_2$.

Slope and intercept of a line passing through an optical flow may be calculated. Assume slope and intercept of $l_1$ are $k_1$ and $m_1$ respectively, and slope and intercept of $l_2$ are $k_2$ and $m_2$ respectively (slope is defined as $$k = \frac{\Delta u}{\Delta v}$$

herein), therefore, $l_1$ and $l_2$ may be expressed by the following equations:

$l_1: U_1 - k_1 V_1 = m_1$ and $l_2: U_2 - k_2 V_2 = m_2$.

Figure 5:
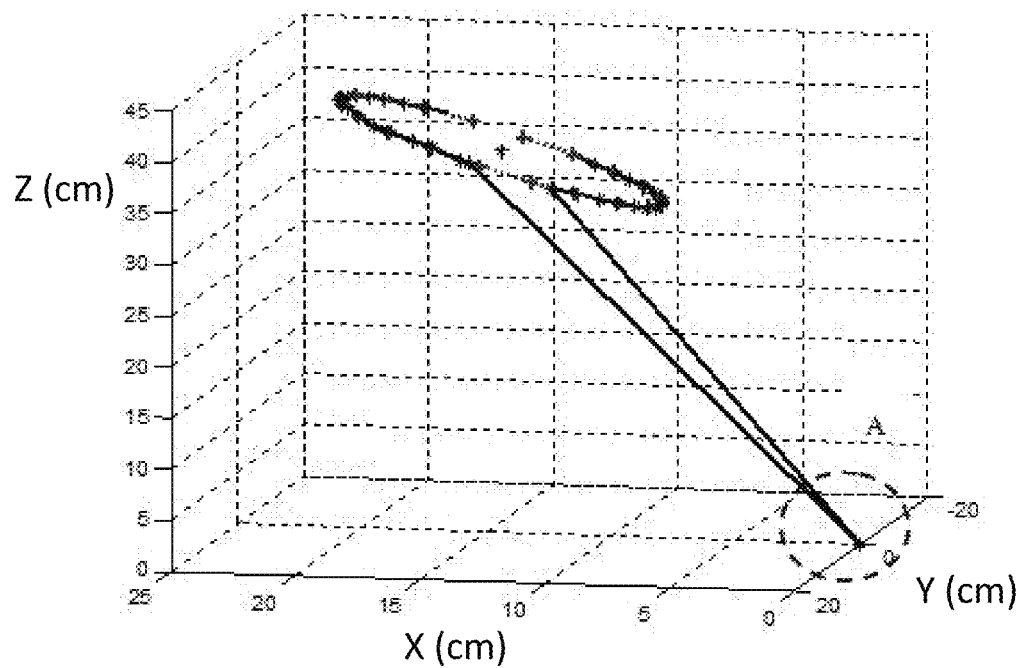
FIG. 5 is a schematic diagram of an inflection point being caused by an area ineffective for reconstruction in an optical flow trajectory.

When no parallax occurs in a direction U for an optical flow, $\Delta u=0$ and therefore $k_1=k_2=0$; and when no parallax occurs in a direction V for an optical flow, $\Delta v=0$ and therefore $k_1=k_2=\infty$. It is impossible to reconstruct motion vectors of a feature point of the target by the optical flow segment under the above two conditions. As shown in FIG. 5, it is obvious that an inflection point exists in a trajectory reconstructed by binocular optical flows without removing an area ineffective for reconstructing the three-dimensional movement trajectory, which is labeled as A.

Assume an optical flow of a left image sequence is $P_1P'_1$, $P'_1P''_1$, $P''_1P'''_1$ ... $P_1^{(n-1)}P_1^{(n)}$ and an optical flow of a right image sequence is $P_2P'_2$, $P'_2P''_2$, $P''_2P'''_2$ ... $P_2^{(n-1)}P_2^{(n)}$ for the feature point P of the target, calculate difference in the direction U and the direction V respectively for each segment of the optical flows $P_1^{(i-1)}P_1^{(i)}$ and $P_2^{(i-1)}P_2^{(i)}$, where i=1, 2 ... n, and remove any segment of the optical flows $P_1^{(i-1)}P_1^{(i)}$ and $P_2^{(i-1)}P_2^{(i)}$ with a difference of 0 in the direction U or the direction V.

(4) Reconstructing a three-dimensional movement trajectory of each of the feature points according to the effective area-constrained binocular optical flows thereof obtained in step (3).

FIG. 2 shows a module of a three-dimensional motion vector being projected onto a binocular imaging system, where a target rotates around a rotation axis and is shown in solid lines and dotted line before and after the rotation respectively, a point P corresponds to a point P' after rotation, and $\overrightarrow{PP'}$ is a three-dimensional motion vector of a feature point of the target.

$O_1X_1Y_1Z_1$ represents a left camera coordinate system, $O_2X_2Y_2Z_2$ represents a right camera coordinate system, $O'_1U_1V_1$ represents imaging plane coordinate system of the left camera and is parallel with a plane $O_1X_1Y_1$, and $O'_2U_2V_2$ represents imaging plane coordinate system of the right camera and is parallel with a plane $O_2X_2Y_2$. Both cameras are based on pinhole module, where $O_1$ and $O_2$ are pinholes of the left camera and the right camera respectively, and $O_1O'_1$ and $O_2O'_2$ are focal lengths of the left camera and the right camera respectively, both of which equal f. Optical axes $O_1Z_1$ and $O_2Z_2$ of the two cameras are parallel, and a baseline distance therebetween $O_1O_2$ equals b.

Generally, a spatial coordinate system is defined overlapping with the left camera coordinate system $O_2X_1Y_1Z_1$ for convenience of calculation. Therefore, no rotation or translation occurs for the left camera coordinate system relative to the spatial coordinate system, while only a parallel movement occurs for the right camera coordinate system relative to the spatial coordinate system and the offset is the baseline distance of the two cameras b.

$P_1$ is projection of the point P on an imaging plane of the left camera, $P'_1$ is projection of the point P' on an imaging plane of the left camera, and $\overrightarrow{P_1P'_1}$ is an optical flow segment generated by a three-dimensional motion vector $\overrightarrow{PP'}$ projected onto imaging plane of the left camera. Similarly, $\overrightarrow{P_2P'_2}$ is an optical flow segment generated by $\overrightarrow{PP'}$ projected onto imaging plane of the right camera.

Coordinates of $P_1$ and $P'_1$ are $(U_1,V_1)$ and $(U'_1,V'_1)$ respectively in imaging plane coordinate system $O'_1U_1V_1$ of the left camera, coordinates of $P_2$ and $P'_2$ are $(U_2,V_2)$ and $(U'_2,V'_2)$ respectively in imaging plane coordinate system $O'_2U_2V_2$ of the right camera, and coordinates of P and P' are (X,Y,Z) and (X',Y',Z') respectively in the spatial coordinate system.

The following equations may be obtained according to pinhole module of the cameras:

$$\begin{cases} U_1 = X\frac{f_{x1}}{Z} \\ V_1 = Y\frac{f_{x1}}{Z} \end{cases} \quad \begin{cases} U'_1 = X'\frac{f_{x1}}{Z'} \\ V'_1 = Y'\frac{f_{x1}}{Z'} \end{cases} \quad (1)$$

$$\begin{cases} U_2 = (X-b_0)\frac{f_{x2}}{Z} \\ V_2 = Y\frac{f_{y2}}{Z} \end{cases} \quad \begin{cases} U'_2 = (X'-b_0)\frac{f_{x2}}{Z'} \\ V'_2 = Y'\frac{f_{y2}}{Z'} \end{cases} \quad (2)$$

An equation of a line passing through $\overrightarrow{P_1P'_1}$ in the coordinate system $O'_1U_1V_1$ is as follows:

$$V = \frac{V_1 - V'_1}{U_1 - U'_1}(U - U_1) + V_1 \quad (3)$$

An equation of a line passing through $\overrightarrow{P_2P'_2}$ in the coordinate system $O'_2U_2V_2$ is as follows:

$$V = \frac{V_2 - V'_2}{U_2 - U'_2}(U - U_2) + V_2 \quad (4)$$

An equation of a line passing through the three-dimensional motion vector $\overrightarrow{PP'}$ in the spatial coordinate system is as follows:

$$\begin{cases} x = az + p \\ y = bz + q \end{cases}, (q \neq 0) \quad (5)$$

Assume $l_1$ is a line passing through the optical flow segment $\overrightarrow{P_1P'_1}$ on an imaging plane of the left camera, and $l_2$ is a line passing through the optical flow segment $\overrightarrow{P_2P'_2}$ on an imaging plane of the right camera. According to equations (3), (4) and (5), equations of $l_1$ and $l_2$ in respective imaging plane coordinate systems are as follows:

$$l_1: qf_{y1}U_1 - pf_{x1}V_1 = (aq-bp)f_{x1}f_{y1} \quad (6)$$

$$l_2: qf_{y2}U_2 - (p-b_0)f_{x2}V_2 = [aq-b(p-b_0)]f_{x2}f_{y2} \quad (7)$$

where $b_0$ is a baseline length between the left camera and the right camera, $f_{x1}$ and $f_{y1}$ are equivalent focal lengths of the left camera in a direction X and a direction Y respectively, and $f_{x2}$ and $f_{y2}$ are equivalent focal lengths of the right camera in the direction X and the direction Y respectively.

Since optical flows may be detected directly in image sequences, slope and intercept of a line passing through an optical flow segment may be calculated. Assume slope and intercept of $l_1$ are $k_1$ and $m_1$ respectively, and slope and intercept of $l_2$ are $k_2$ and $m_2$ respectively (slope is defined as $$k = \frac{\Delta u}{\Delta v}$$

herein), therefore, $l_1$ and $l_2$ may be expressed by the following equations:

$$l_1: U_1 - k_1V_1 = m_1 \quad (8)$$

$$l_2: U_2 - k_2V_2 = m_2 \quad (9)$$

The following equations may be obtained according to equations (6)-(9):

$$\begin{cases} k_1 = \dfrac{pf_{x1}}{qf_{y1}} \\ m_1 = \dfrac{aq-bp}{q}f_{x1} \\ k_2 = \dfrac{p-b_0}{qf_{y2}}f_{x2} \\ m_2 = \dfrac{aq-bp+bb_0}{q}f_{x2} \end{cases} \quad (10)$$

a, b, p and q may be calculated by equation (10) and are as follows:

$$\begin{cases} a = (m_2 f_{x1} - m_1 f_{x2})/(k_1 f_{x2} f_{y1} - k_2 f_{x1} f_{y2}) \\ b = (m_2 f_{x1} - m_1 f_{x2})/(k_1 f_{x2} f_{y1} - k_2 f_{x1} f_{y2}) \\ p = k_1 b_0 f_{x2} f_{y1}/(k_1 f_{x2} f_{y1} - k_2 f_{x1} f_{y2}) \\ q = b_0 f_{x1} f_{x2}/(k_1 f_{x2} f_{y1} - k_2 f_{x1} f_{y2}) \end{cases} \quad (11)$$

The equation of the line passing through the three-dimensional motion vector in the spatial coordinate system may be obtained by combining equation (11) and equation (5).

Figure 4:
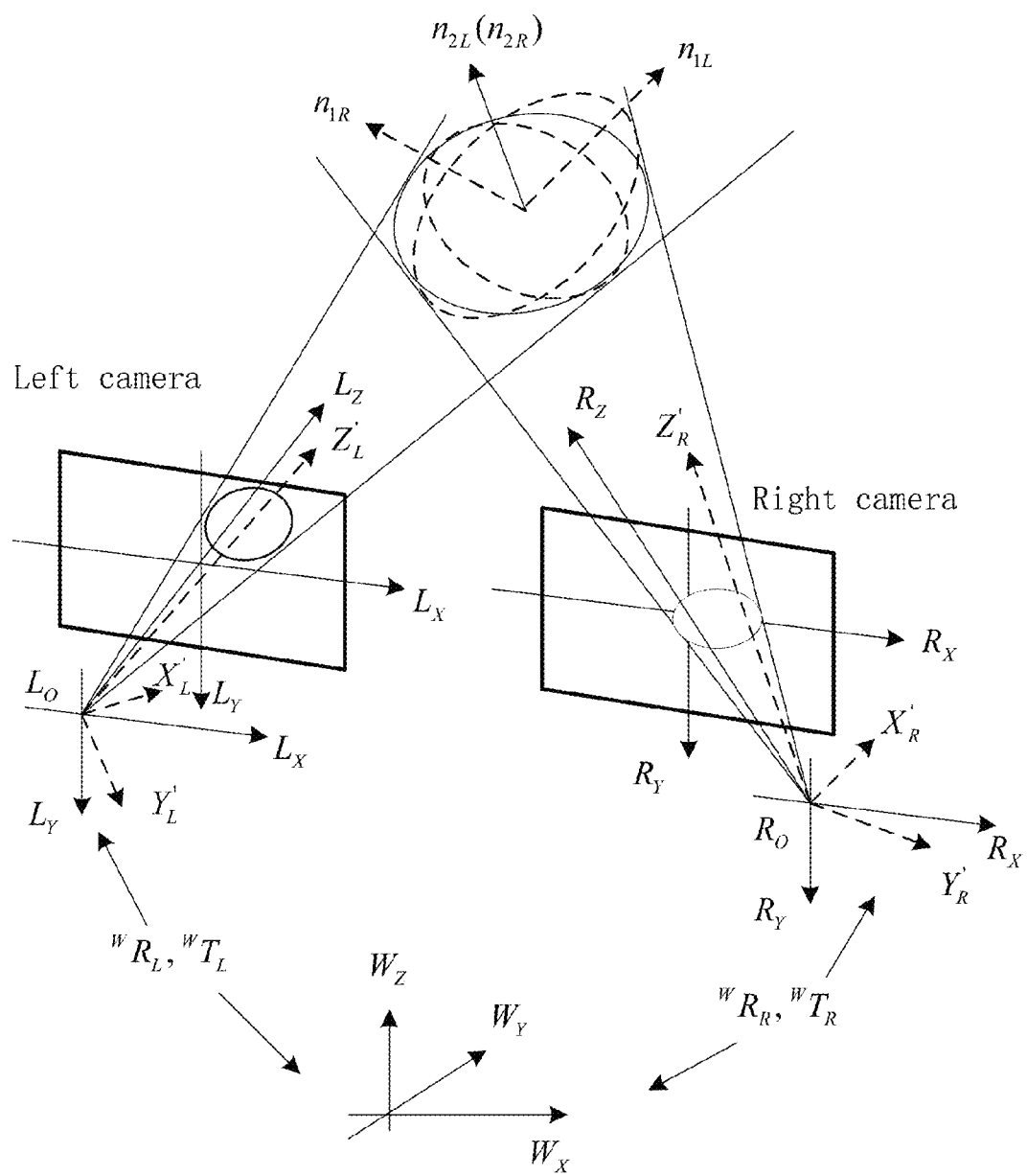
FIG. 4 is a schematic diagram of reconstructing a three-dimensional movement trajectory of a target by binocular optical flows thereof.

(5) calculating a normal vector of a three-dimensional movement trajectory plane of each of the feature points, calculating inner product of the normal vector of each of the feature points and a direction vector of each segment of the trajectory thereof sequentially, removing a segment of the trajectory of each of the feature points with a maximum inner product, recalculating a normal vector of a trajectory plane of each of the feature points according to the residual trajectory thereof, and calculating a cosine distance between the two normal vectors of each of the feature points.

n motion vectors may be reconstructed for a feature point P of the target rotating around a rotation axis by n optical flow segments obtained from left images and right images respectively. $P_1$ is projection of P on a left image, $P_2$ is projection of P on a right image, n optical flow segments obtained from left images are from $P_1$ to $P_1^{(n)}$, n optical flow segments obtained from right images are from $P_2$ to $P_2^{(n)}$, and reconstructed motion vectors are $\overrightarrow{PP'}, \overrightarrow{P'P''}, \overrightarrow{P''P'''} \ldots \overrightarrow{P^{(n-1)}P^{(n)}}$. As shown in FIG. 4, a motion vector of a current optical flow trajectory plane is calculated and is represented by $\overrightarrow{w_t} = (w_{tx}, w_{ty}, w_{tz})^T$, and an equation of a line passing through any one of the three-dimensional motion vectors $\overrightarrow{PP'}, \overrightarrow{P'P''}, \overrightarrow{P''P'''} \ldots \overrightarrow{P^{(n-1)}P^{(n)}}$ calculated by step (4) is as follows:

$$\begin{cases} x = az + p \\ y = bz + q \end{cases}, (q \neq 0) \quad (12)$$

where the direction of each motion vector is $\overrightarrow{w_i} = (a,b,1)$, and $i=1, 2 \ldots n$. Cosine distance is used to estimate similarity between two motion vectors herein for it is applicable for describing difference between directions of two vectors. Calculate cosine distance $\cos(\theta_i)$ between each of the motion vectors of each of the feature points and the normal vector of the optical flow trajectory plane thereof, where $$\cos(\theta_i) = \frac{\overrightarrow{w_t}^T \cdot \overrightarrow{w_i}}{|\overrightarrow{w_t}||\overrightarrow{w_i}|}, (i=1,2 \ldots n) \quad (13)$$

$\cos(\theta_i)$ is in a range of [−1, 1], where the larger the cosine distance is, the smaller the angle between the two vectors is; the smaller the cosine distance is, the larger the angle between the two vector is; the cosine distance equals a maximum value 1 when directions of the two vectors overlaps; and the cosine distance equals a minimum value −1 when directions of the two vectors are opposite. Maximum of modulus of the cosine distance is calculated by the following equation:

$$E(j) = \max(|\cos(\theta_i)|), (i=1,2 \ldots n) \quad (14)$$

(6) repeating calculations in step (4) and step (5) until cosine distance between normal vectors of the two trajectory planes remains the same or changes slightly.

Remove a segment of binocular optical flows of the feature points with a maximum modulus of cosine distance from obtained k segments of binocular optical flows thereof, whereby obtaining residual k−1 segments of binocular optical flows for each of the feature points, recalculate a normal vector $\overrightarrow{w'_t} = (w'_{tx}, w'_{ty}, w'_{tz})^T$ estimated by the k−1 segments of binocular optical flows for each of the feature points, and calculate cosine distance between the two normal vectors $$\cos(\alpha) = \frac{\overrightarrow{w_t}^T \cdot \overrightarrow{w'_t}}{|\overrightarrow{w_t}||\overrightarrow{w'_t}|} \quad (15)$$

A threshold of the cosine distance is set to L. When cosine distance between the two normal vectors is greater than the threshold, repeat step (4) and step (5) until the cosine distance is no more than the threshold.

Figure 6:
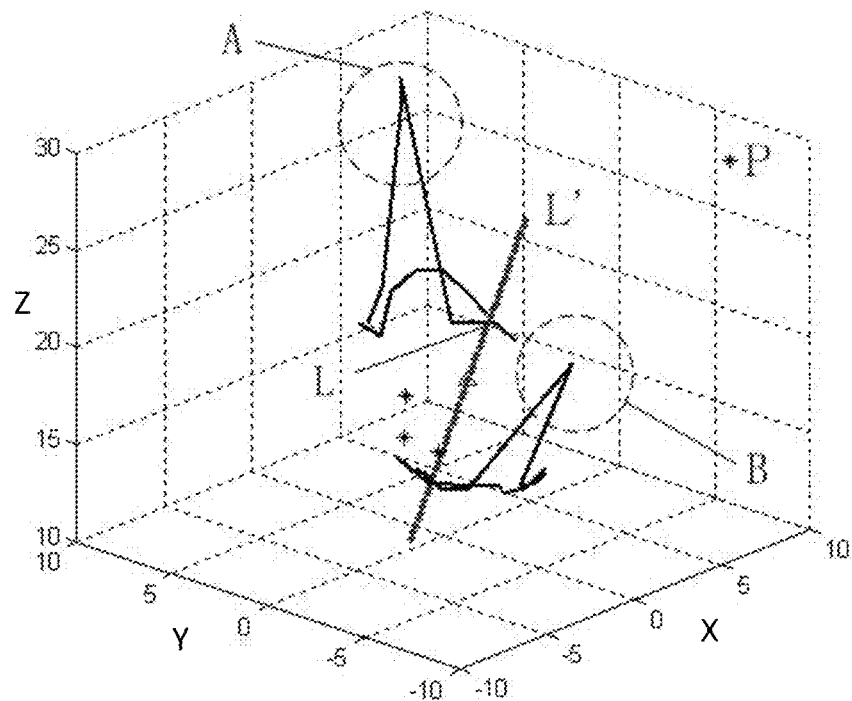
FIG. 6 is a schematic diagram illustrating influence of inflection points in an estimated spatial trajectory of a feature point on estimation of a rotation axis.

At times when optical flows formed by a three-dimensional motion vector projected onto imaging planes of the two cameras are far smaller than the three-dimensional motion vector itself (namely an angle between the three-dimensional motion vector and the imaging plane is comparatively large), loss of depth information is comparatively large during reconstructing the three-dimensional motion vector for binocular parallax of the optical flows is comparatively small, and therefore inflections appear apparently in certain moments of the reconstructed trajectory during reconstructing spatial trajectory of the three-dimensional motion vectors (refer to A and B in FIG. 6). In terms of the above analysis, effective areas of binocular optical flows of the reconstructed three-dimensional motion vector sequence should be estimated first before estimating the rotation axis, otherwise, accuracy of estimation of the rotation axis would be seriously affected. In FIG. 6, L is a real rotation axis, L' is an estimated rotation axis, and P is center of a wrongly-estimated circular trajectory.

(7) Estimating a trajectory plane of each of the feature points and center of the trajectory thereof.

Figure 3:
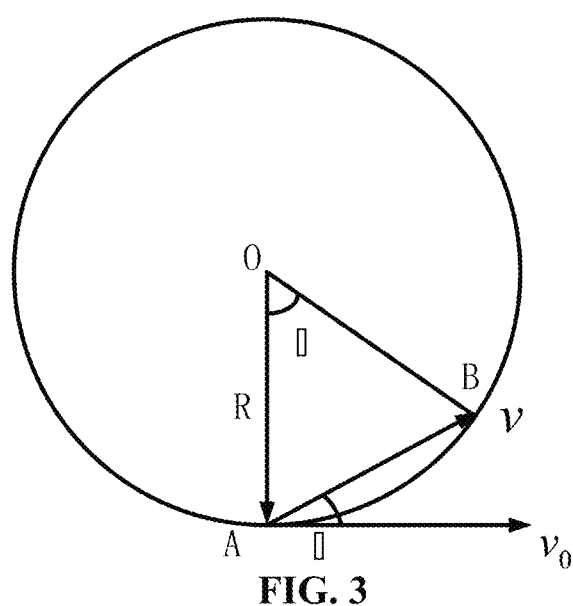
FIG. 3 illustrates an arc trajectory of a feature point.

As shown in FIG. 3, a point of a target moves around a rotation axis from a point A to a point B during a unit of time period t, where radius of the arc trajectory is R, a rotation angle is θ, and a line speed is $\vec{v_0}$. In the unit of time period t, an average speed from A to B is $\vec{v}$, and an angle between the two vectors $\vec{v_0}$ and $\vec{v}$ is φ. Relationship between $\vec{v_0}$ and $\vec{v}$ is illustrated by equation (16):

$$\frac{|\vec{v}|}{|\vec{v_0}|} = \frac{|\overrightarrow{AB}|}{|\overrightarrow{AB}|} = \frac{2R\sin\frac{\theta}{2}}{\theta R} = \frac{\sin\varphi}{\varphi} \tag{16}$$

Assume an angle speed of the spinning target is $\vec{\omega}=(\omega_x,\omega_y,\omega_z)^T$ and $\Omega=|\vec{\omega}|$, and the following equation may be obtained by equation (16):

$$\frac{|\vec{v}|}{|\vec{v_0}|} = \frac{\sin\left(\frac{1}{2}\Omega t\right)}{\frac{1}{2}\Omega t} \tag{17}$$

Relationship of modulus of $\vec{v_0}$ and $\vec{v}$ is analyzed above, where the vector $\vec{v}$ may be regarded as a result of the vector $\vec{v_0}$ rotating an angle of φ and experiencing a modulus scaling process thereafter. Assume $R_t$ is a rotation matrix from $\vec{v_0}$ to $\vec{v}$, and a matrix $\hat{\omega}'$ is expressed by the following equation:

$$\hat{\omega}' = \begin{bmatrix} 0 & -\omega'_z & \omega'_y \\ \omega'_z & 0 & -\omega'_x \\ -\omega'_y & \omega'_x & 0 \end{bmatrix} \tag{18}$$

where $\vec{\omega}'=(\omega'_x,\omega'_y,\omega'_z)^T$, $\vec{\omega}'$ is a unit vector of $\vec{\omega}$, and $R_t=I+\sin(\frac{1}{2}\Omega t)\cdot\hat{\omega}'+[1-\cos(\frac{1}{2}\Omega t)]\cdot\hat{\omega}'^2$.

Relationship of $\vec{v_0}$ and $\vec{v}$ is obtained by the above analysis and is expressed by the following equation:

$$\vec{v} = \frac{\sin\left(\frac{1}{2}\Omega t\right)}{\frac{1}{2}\Omega t} R_t \vec{v_0} \tag{19}$$

As $\vec{v_0}=\vec{\omega}\times\overrightarrow{OA}=\Omega\cdot\hat{\omega}'\cdot\overrightarrow{OA}$, the following equation may be obtained:

$$\overrightarrow{AB} = \tag{20}$$

$$\vec{v}\cdot t = \frac{\sin\left(\frac{1}{2}\Omega t\right)}{\frac{1}{2}\Omega t} R_t \cdot \vec{v_0} \cdot t = \left\{\sin(\Omega t)\cdot\hat{\omega}' + [1-\cos(\Omega t)]\cdot\hat{\omega}'^2\right\}\cdot\overrightarrow{OA}$$

Assume $M=\sin(\Omega t)\cdot\hat{\omega}'+[1-\cos(\Omega t)]\cdot\hat{\omega}'^2$ which is further expressed by the following equation:

$$M = \begin{bmatrix} -(1-\cos\Omega t) & (1-\cos\Omega t)\omega'_x\omega'_y - \omega'_z\sin\Omega t & (1-\cos\Omega t)\omega'_x\omega'_z + \omega'_y\sin\Omega t \\ (1-\cos\Omega t)\omega'_x\omega'_y + \omega'_z\sin\Omega t & -(1-\cos\Omega t)(1-\omega'^2_y) & (1-\cos\Omega t)\omega'_y\omega'_z - \omega'_x\sin\Omega t \\ (1-\cos\Omega t)\omega'_x\omega'_z - \omega'_y\sin\Omega t & (1-\cos\Omega t)\omega'_y\omega'_z + \omega'_x\sin\Omega t & -(1-\cos\Omega t)(1-\omega'^2_z) \end{bmatrix} \tag{21}$$

Assume coordinate of the point A is $(x_A,y_A,z_A)^T$, and coordinate of the point O is $(x_O,y_O,z_O)^T$, and the vector $\overrightarrow{AB}$ may be reconstructed by binocular optical flows. Assume $\overrightarrow{AB}=(x,y,z)^T$, whereby obtaining the following equation:

$$M \cdot \begin{bmatrix} x_A - x_O \\ y_A - y_O \\ z_A - z_O \end{bmatrix} = \begin{bmatrix} x \\ y \\ z \end{bmatrix} \tag{22}$$

Substitute variables according to the following equations:

$Q_1=(1-\cos\Omega t)(1-\omega'^2_x)$, $Q_2=(1-\cos\Omega t)(1-\omega'^2_y)$, $Q_3=(1-\cos\Omega t)(1-\omega'^2_z)$, $Q_4=(1-\cos\Omega t)\omega'_x\omega'_y$, $Q_5=(1-\cos\Omega t)\omega'_x\omega_z$, $Q_6=(1-\cos\Omega t)\omega'_y\omega'_z$, $Q_7=\omega'_x\sin\Omega t$, $Q_8=\omega'_y\sin\Omega t$, $Q_9=\omega'_z\sin\Omega t$, $Q_{10}=x_0Q_1y_0Q_4-z_0Q_5-z_0Q_8+y_0Q_9$, $Q_{11}=y_0Q_2-x_0Q_4-z_0Q_6+z_0Q_7-x_0Q_9,$ $Q_{12}=z_0Q_3-x_0Q_5-y_0Q_6-y_0Q_7+x_0Q_8,$ An equation may be obtained as follows:

$$\begin{bmatrix} -x_A & 0 & 0 & y_A & z_A & 0 & 0 & z_A & -y_A & 1 & 0 & 0 \\ 0 & -y_A & 0 & x_A & 0 & z_A & -z_A & 0 & x_A & 0 & 1 & 0 \\ 0 & 0 & -z_A & 0 & x_A & y_A & y_A & -x_A & 0 & 0 & 0 & 1 \end{bmatrix} \cdot \begin{bmatrix} Q_1 \\ \vdots \\ Q_{12} \end{bmatrix} = \begin{bmatrix} x \\ y \\ z \end{bmatrix} \quad (23)$$

The above 3 equations may be obtained if spatial location variation of a feature point in a time period is observed, and $Q_1$ to $Q_{12}$ may be calculated if spatial location variation of multiple feature points in multiple time periods is observed, which makes coefficient matrix of the equation have more than 12 rows.

As $$\begin{bmatrix} Q_1 & Q_9-Q_4 & -(Q_5+Q_8) \\ -(Q_9+Q_4) & Q_2 & Q_7-Q_6 \\ Q_8-Q_5 & -(Q_6+Q_7) & Q_3 \end{bmatrix} \cdot \begin{bmatrix} x_0 \\ y_0 \\ z_0 \end{bmatrix} = \begin{bmatrix} Q_{10} \\ Q_{11} \\ Q_{12} \end{bmatrix} \quad (24)$$

coordinate $(x_O, y_O, z_O)^T$ of O may be calculated. Since $$\omega'_x : \omega'_y : \omega'_z = Q_7 : Q_8 : Q_9. \quad (25)$$

and $\vec{\omega}' = (\omega'_x, \omega'_y, \omega'_z)^T$ which is a unit vector, it can be derived that $\omega'^2_x + \omega'^2_y + \omega_z^2 = 1$. $(\omega'_x, \omega'_y, \omega'_z)^T$ may be calculated by combining with equation (25). Since direction of the rotation axis is the same as that of $\vec{\omega}'$, and the rotation axis passes through the point $(x_O, y_O, z_O)^T$, an equation of the rotation axis in the spatial coordinate system is as follows:

$$\frac{X-x_0}{\omega'_x} = \frac{Y-y_0}{\omega'_y} = \frac{Z-z_0}{\omega'_z}. \quad (26)$$

and a radius $$R' = \frac{|(x_o-x_A, y_o-y_A, z_o-z_A) \times (x, y, z)|}{\sqrt{x^2+y^2+z^2}}.$$

Besides, angle speed of the spinning target may be obtained according to an equation $$\Omega = \frac{1}{t}\arcsin\frac{Q_7}{\omega'_x} = \frac{1}{t}\arcsin\frac{Q_8}{\omega'_y} = \frac{1}{t}\arcsin\frac{Q_9}{\omega'_z}.$$

In terms of the above principles, optical flows formed by discrete movement of a feature point of the target projected onto the left camera and the right camera in a series of time periods may be obtained according to left image sequences and right image sequence of the target rotating around a rotation axis. Remove areas ineffective for reconstructing a three-dimensional movement trajectory from binocular optical flows of the feature points, whereby obtaining effective area-constrained binocular optical flows, by which three-dimensional motion vectors are reconstructed. Capture four (or more) groups of optical flow stereo image pairs for each of the feature points, substitute the reconstructed three-dimensional motion vectors into equation (22), whereby obtaining direction of a rotation axis estimated by the trajectory of each of the feature points and center and radius of the trajectory thereof.

(8) Performing weighted average on normal vectors of the trajectory planes and on centers of the trajectories respectively according to the radius of the fitted trajectory of each of the feature points, whereby obtaining a spatial equation of a final rotation axis.

Center of an arc trajectory of a feature point and normal direction of the trajectory plane may be obtained by the trajectory of the feature point. In theory, direction of the rotation axis of the target is the same as normal direction of the trajectory plane of each of the feature point and the rotation axis passes through centers of the arc trajectories, therefore, direction of the rotation axis and a point thereon (derived by weighted average of centers of the arc trajectories) may be estimated with comparatively small errors by performing weighted average on directions of rotation axes and centers determined by trajectories of the feature points respectively, where centers and normal directions of arc trajectories with comparatively great radiuses share comparatively great weights in the weighted average process for optical flows formed by feature points rotating with comparatively great radiuses may be detected with comparatively small errors.

For each of the arc trajectories, assume center coordinate is $(x_i, y_i, z_i)$, radius is $r_i$, normal direction of the trajectory plane is $(a_i, b_i, c_i)$, and a final center coordinate $(\bar{x}, \bar{y}, \bar{z})$ and a final normal direction $\{\bar{a}, \bar{b}, \bar{c}\}$ are calculated by the following equations:

$$\bar{x} = \sum_{i=1}^{n}\left(\frac{r_i x_i}{\sum_{j=1}^{n} r_j}\right), \bar{y} = \sum_{i=1}^{n}\left(\frac{r_i y_i}{\sum_{j=1}^{n} r_j}\right), \bar{z} = \sum_{i=1}^{n}\left(\frac{r_i z_i}{\sum_{j=1}^{n} r_j}\right) \quad (27)$$

$$\bar{a} = \sum_{i=1}^{n}\left(\frac{r_i a_i}{\sum_{j=1}^{n} r_j}\right), \bar{b} = \sum_{i=1}^{n}\left(\frac{r_i b_i}{\sum_{j=1}^{n} r_j}\right), \text{and } \bar{c} = \sum_{i=1}^{n}\left(\frac{r_i c_i}{\sum_{j=1}^{n} r_j}\right), \quad (28)$$

The equation of the final rotation axis is as follows:

$$\frac{x-\bar{x}}{\bar{a}} = \frac{y-\bar{y}}{\bar{b}} = \frac{z-\bar{z}}{\bar{c}} \quad (29)$$

(9) repeating steps (1)-(8) when the rotation axis of the spatial target changes in a time period $T_2$ or $T_3$, whereby obtaining a spatial equation of a second rotation axis, and combining the spatial equation of the second rotation axis with that of the former rotation axis, whereby calculating coordinate of mass center of the spatial target.

According to the present invention, effective area-constrained binocular optical flows are obtained by processing image sequences and calculating binocular optical flows, and three-dimensional trajectories of the spatial target are reconstructed by iterations to estimate rotation axes and mass center thereof, which may be used to accurately analyze trajectories of a spatial target quantitatively and estimate an attitude thereof, and is applicable for an observation satellite to measure properties of a spatial target in spinning or attitude adjusting and for autonomous image navigation of an observation satellite gradually moving towards a spatial target.

Correctness and effectiveness of the method of the present invention are further illustrated by simulations and image sequence experiments.

Figure 7:
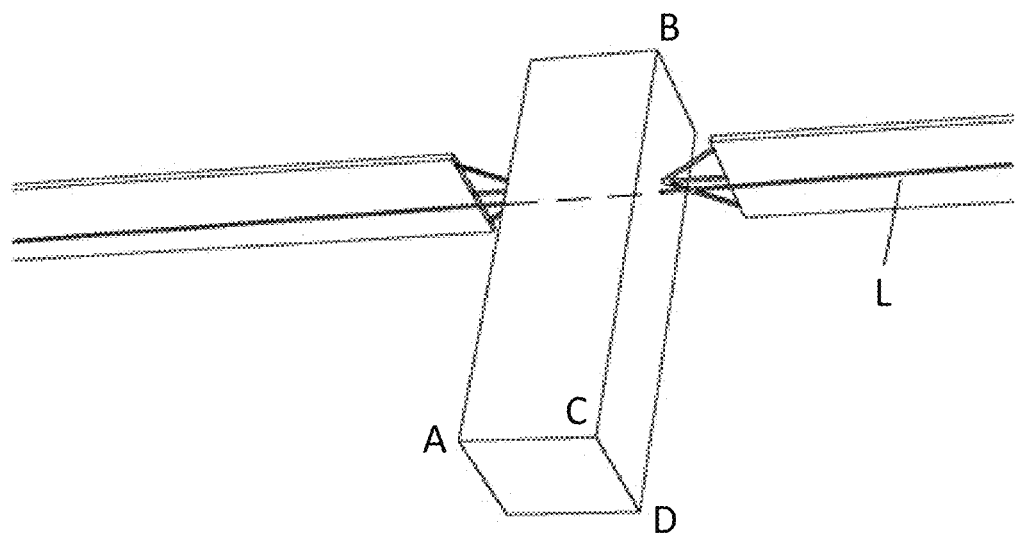
FIG. 7 is a schematic diagram of four feature points detected in a time period $T_1$.
Figure 8A:
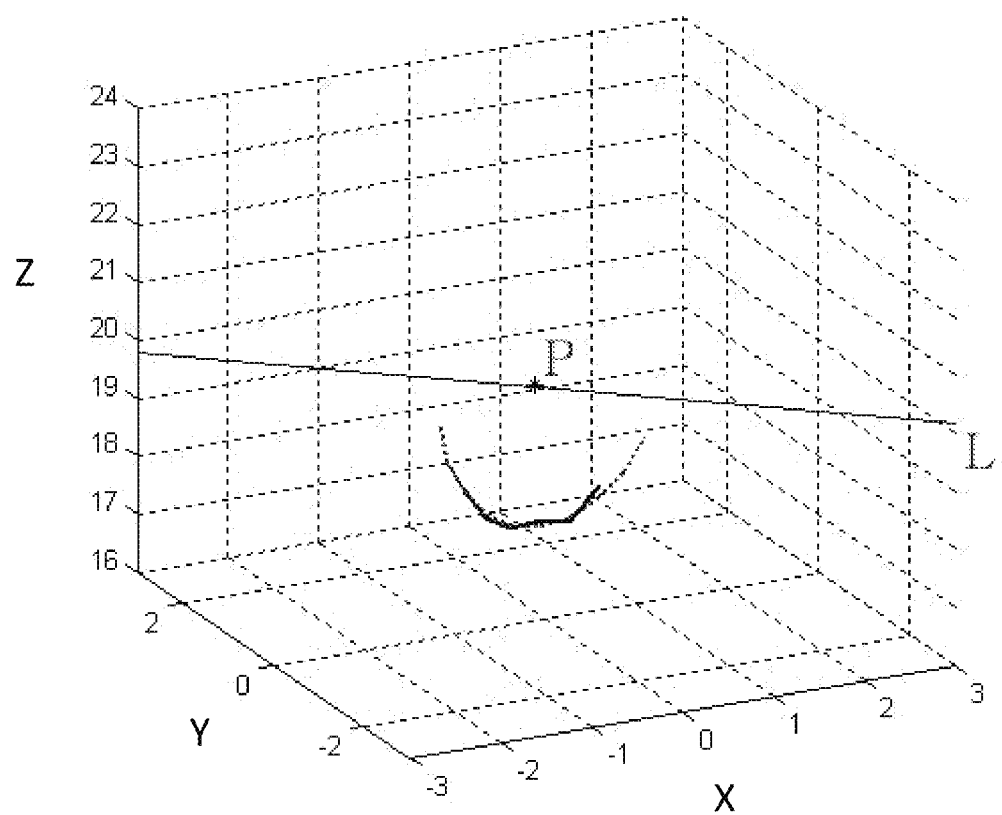
FIG. 8A illustrates a schematic diagram of a trajectory of a feature point A estimated by optical flows calculated by every other frame (the solid line) compared with a real arc trajectory thereof (the dotted line) when a target rotates around a first rotation axis.
Figure 8B:
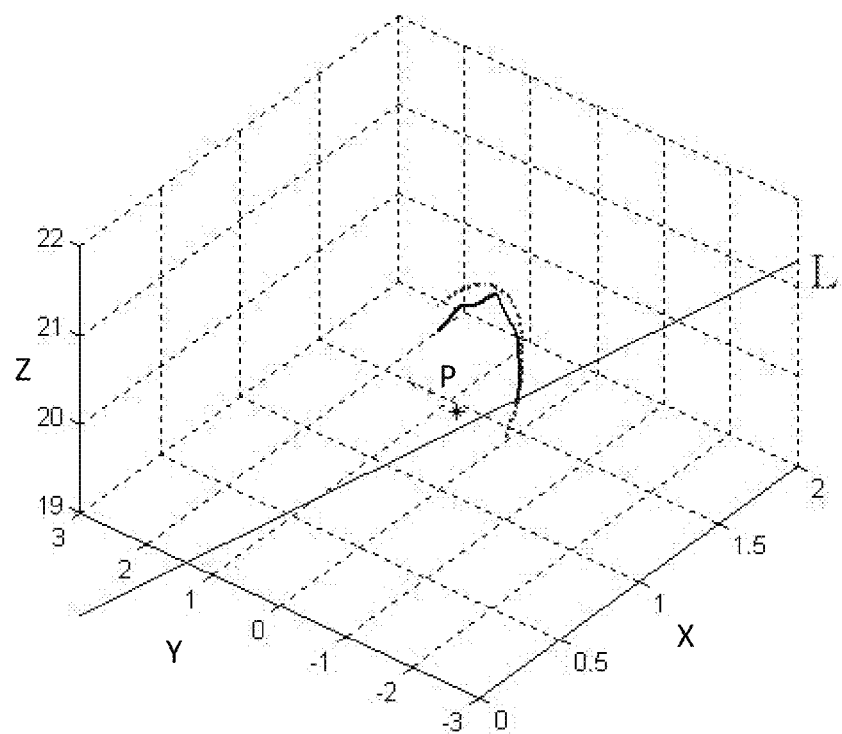
FIG. 8B illustrates a schematic diagram of a trajectory of a feature point B estimated by optical flows calculated by every other frame (the solid line) compared with a real arc trajectory thereof (the dotted line) when the target rotates around the first rotation axis.
Figure 8C:
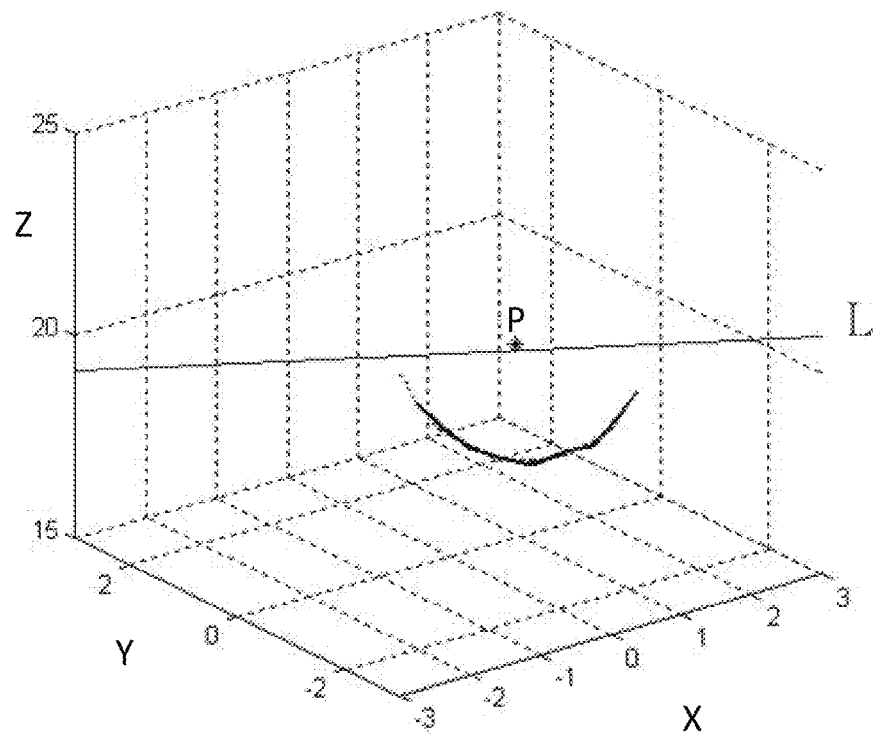
FIG. 8C illustrates a schematic diagram of a trajectory of a feature point C estimated by optical flows calculated by every other frame (the solid line) compared with a real arc trajectory thereof (the dotted line) when the target rotates around the first rotation axis.
Figure 8D:
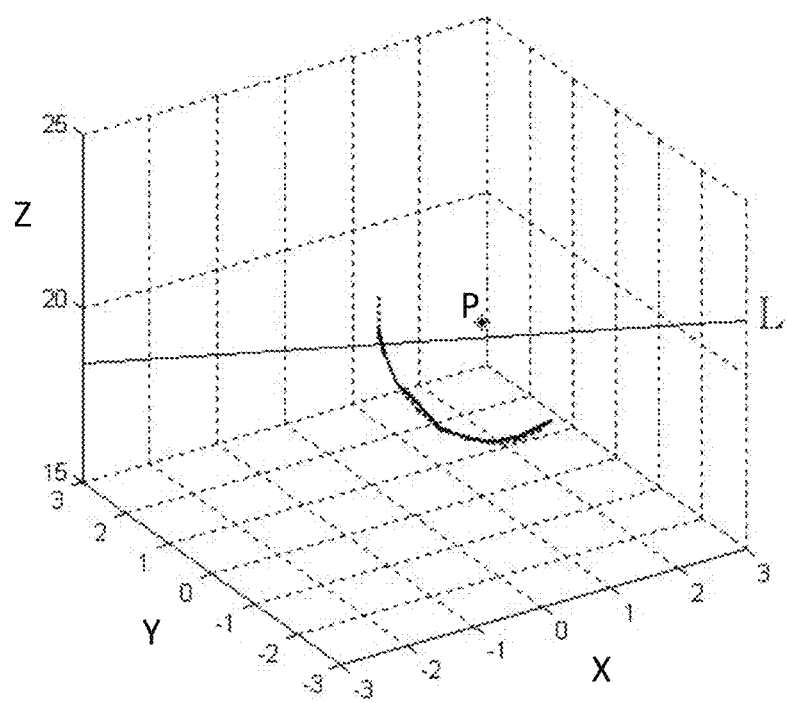
FIG. 8D illustrates a schematic diagram of a trajectory of a feature point D estimated by optical flows calculated by every other frame (the solid line) compared with a real arc trajectory thereof (the dotted line) when the target rotates around the first rotation axis.

During a time period $T_1$, distance between a simulation satellite and a camera is 20 m, spectacular angle of the camera is 10 degrees, L in FIG. 7 is a rotation axis of the satellite, and A, B, C and D in FIG. 7 are detected feature points. Trajectories of feature points A, B, C and D estimated by optical flows calculated by every other frame compared with real arc trajectories thereof are illustrated in FIGS. 8A-8D, in each of which a straight line is an ideal rotation axis, an asterisk labels estimated center of an arc trajectory obtained by step (3), a solid line represents an estimated trajectory of a feature point, a dotted line represents a real arc trajectory thereof, L represents a real rotation axis, and P represents center of the estimated trajectory.

Figure 9:
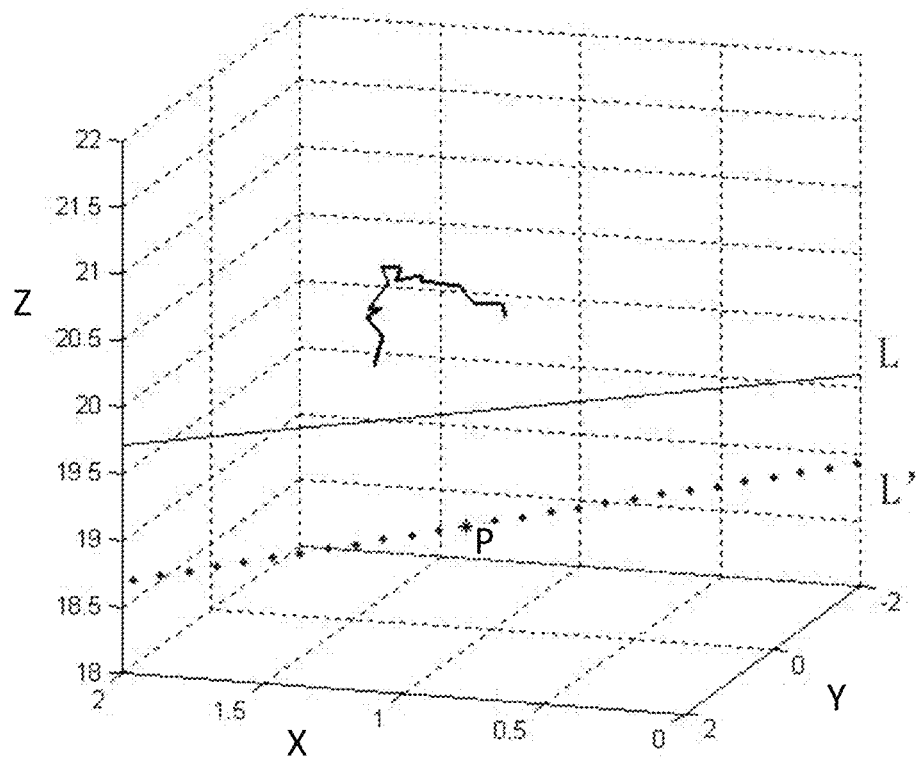
FIG. 9 illustrates a schematic diagram of an estimated rotation axis L' (the dotted line) compared with a real rotation axis L (the solid line) when the target rotates around the first rotation axis.
Figure 10:
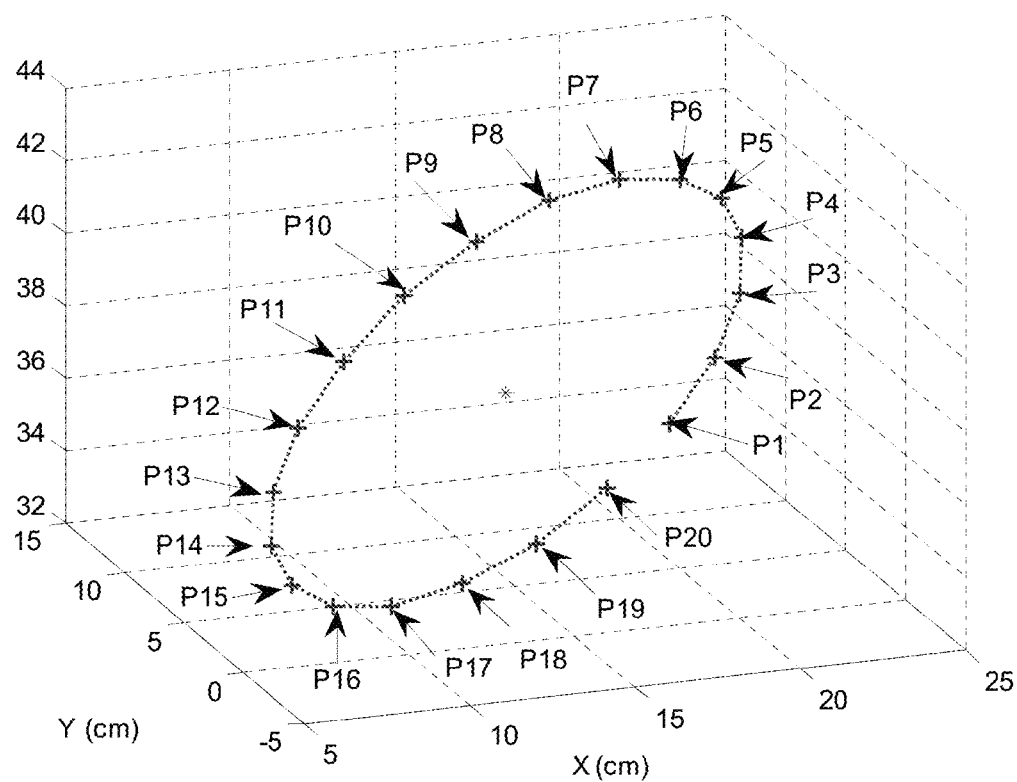
FIG. 10 illustrates a schematic diagram of an ideal three-dimensional movement trajectory formed by a spinning spatial target.

FIG. 9 illustrates a rotation axis estimated by three-dimensional motion vectors of B after optical flow calculation by every other frame, where the solid line L is the real rotation axis, a dotted line L' is an estimated rotation axis, and P represent center of the estimated trajectory.

Figure 11A:
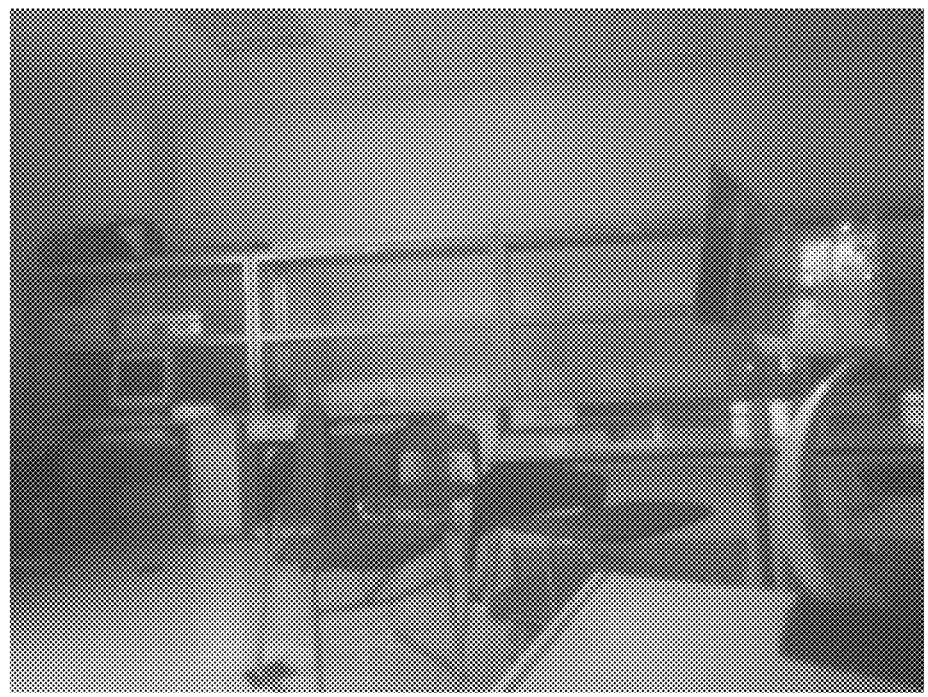
FIG. 11A illustrates a left image out of image sequences of a scenario captured by binocular cameras.
Figure 11B:
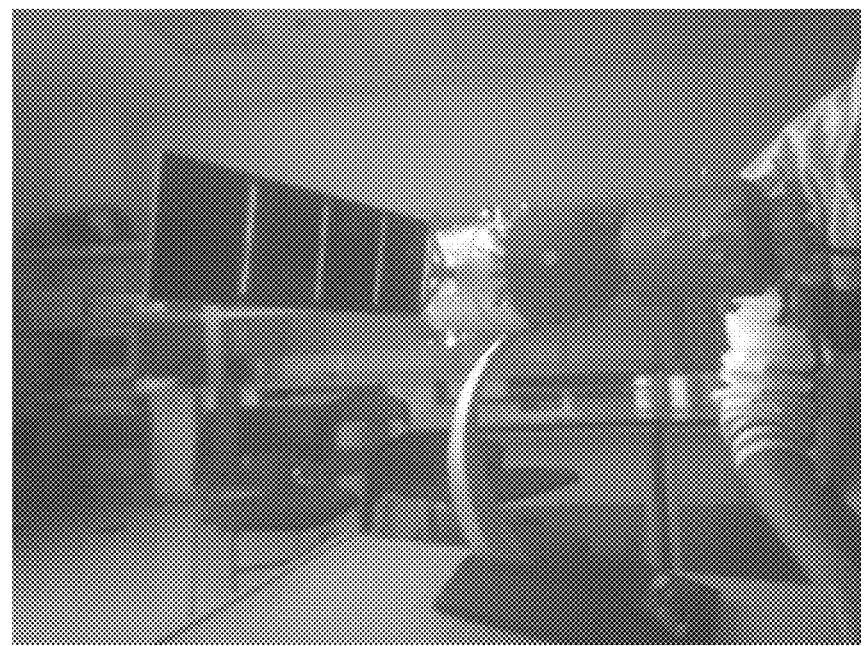
FIG. 11B illustrates a right image out of image sequences of the scenario captured by binocular cameras.
Figure 12A:
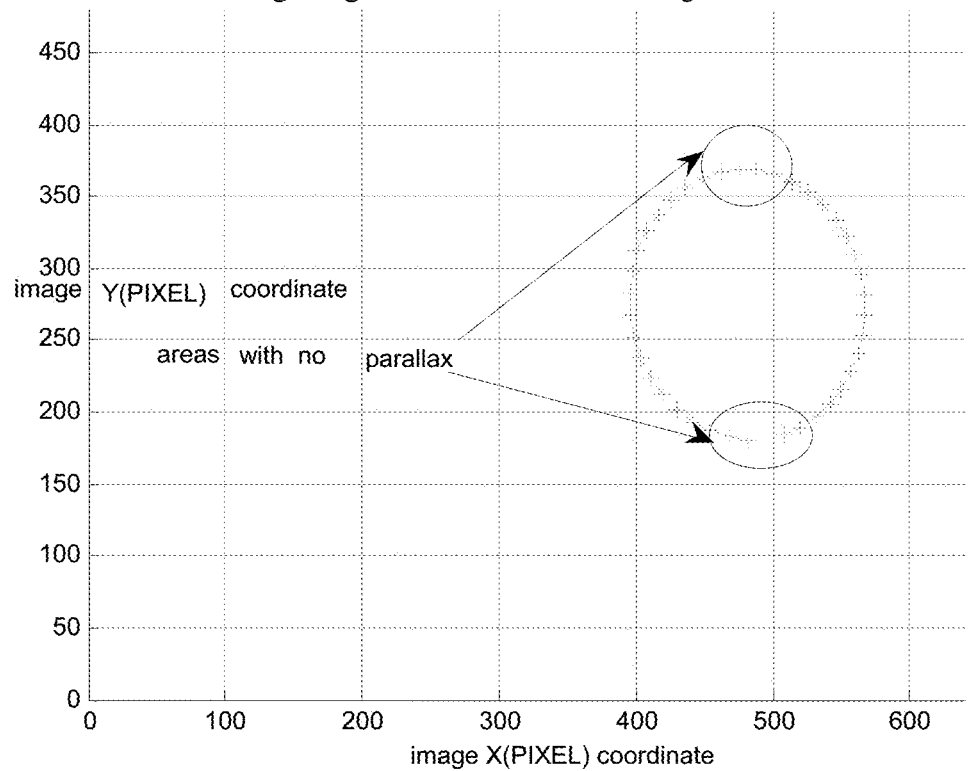
FIGS. 12A and 12B illustrate optical flows obtained by image sequences of a rotational target captured by a stereo camera and areas ineffective for reconstruction thereof.
Figure 12B:
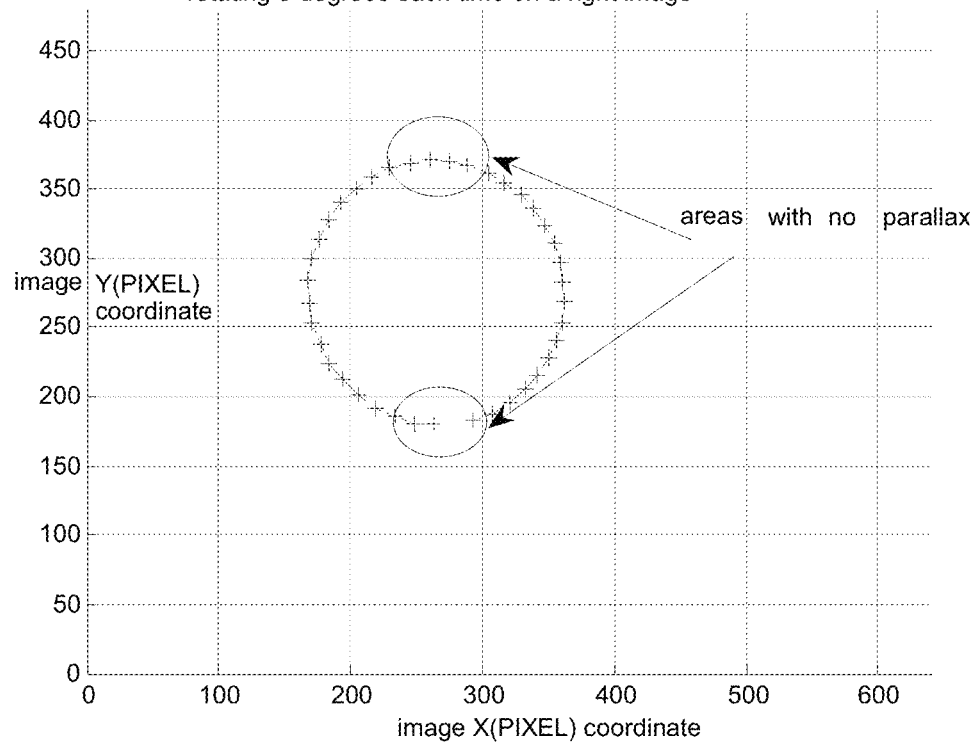
Figure 13:
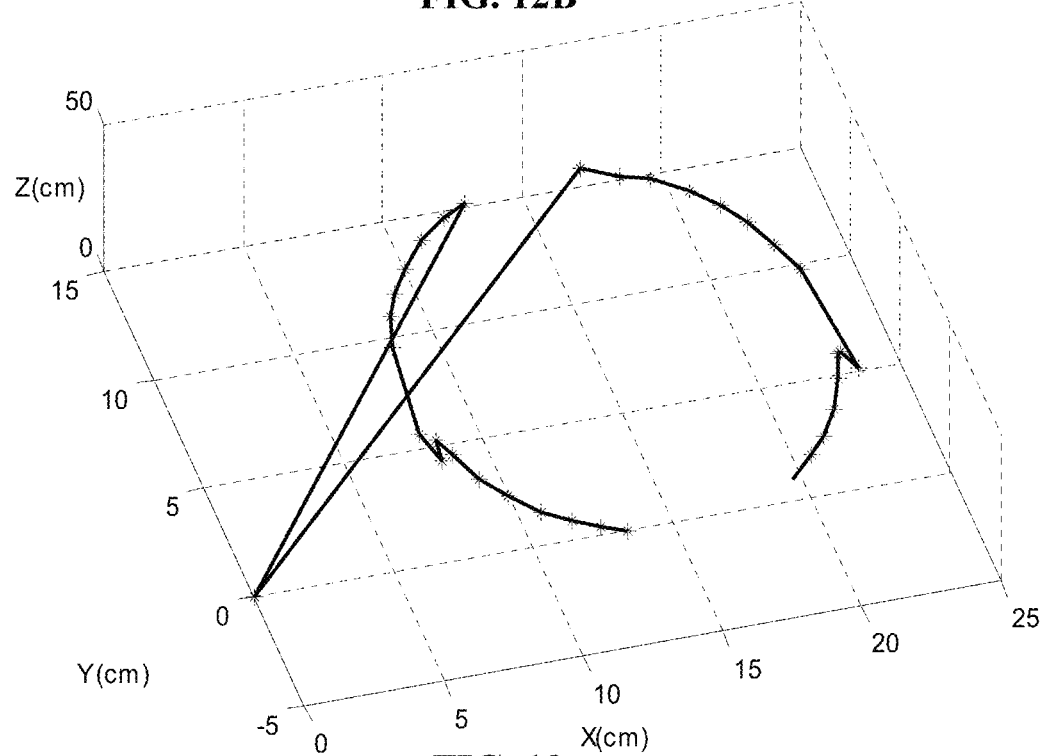
FIG. 13 illustrates a schematic diagram of motion vectors of a three-dimensional movement trajectory of the target reconstructed by binocular optical flows containing areas ineffective for reconstruction.
Figure 14:
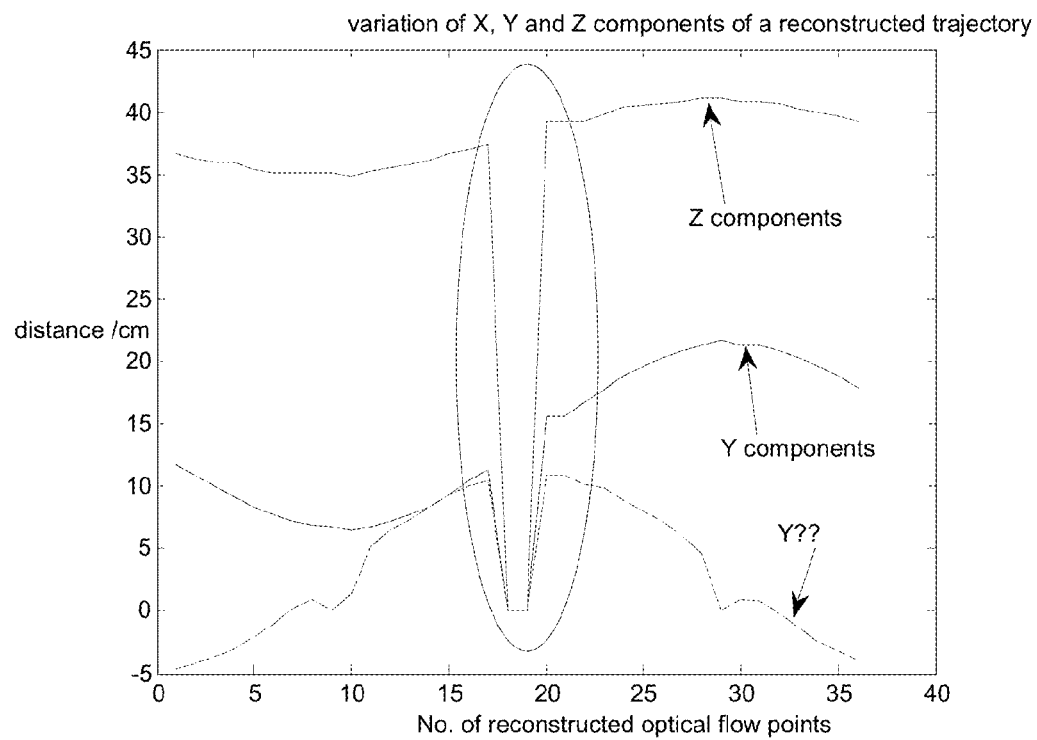
FIG. 14 illustrates an analytical schematic diagram of X, Y and Z components of a trajectory reconstructed by binocular optical flows without removing areas ineffective for reconstruction thereof.
Figure 15:
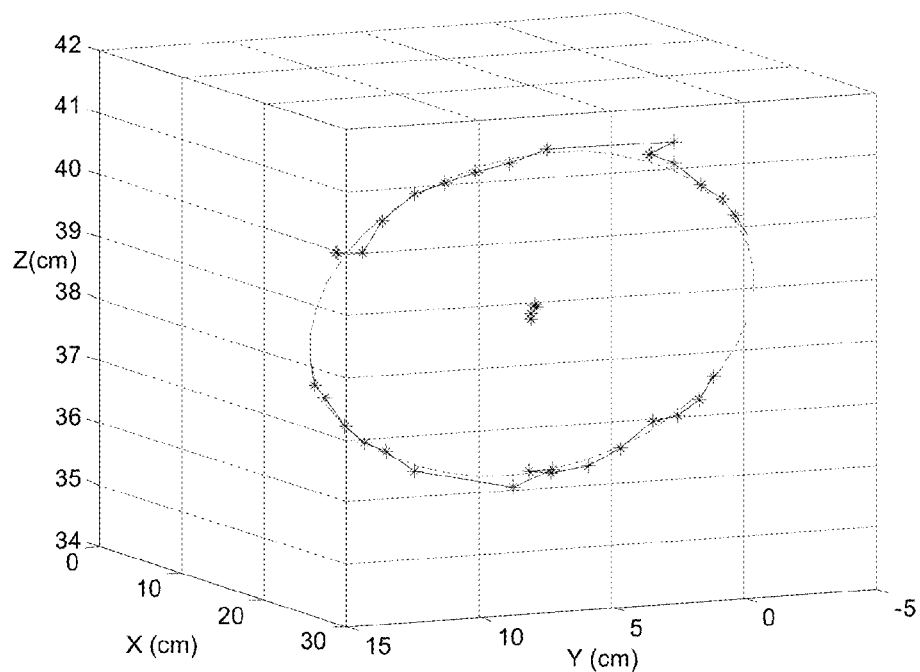
FIG. 15 illustrates a schematic diagram of motion vectors of a three-dimensional movement trajectory of the target reconstructed by binocular optical flows after removing areas ineffective for reconstruction thereof.
Figure 16:
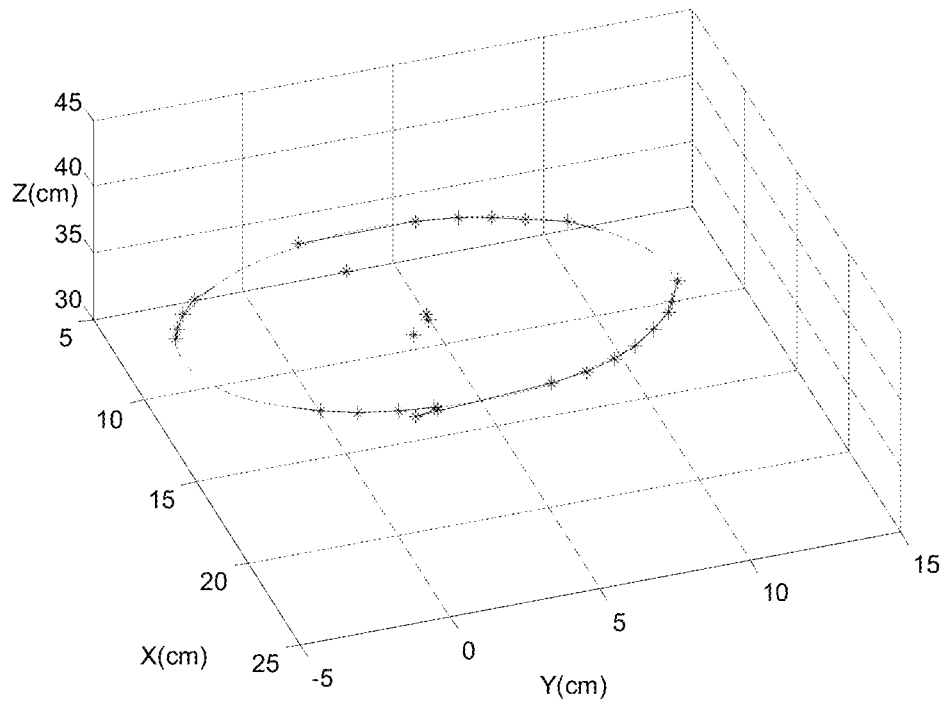
FIG. 16 illustrates a schematic diagram of a trajectory reconstructed by removing areas ineffective for reconstruction or with comparatively large errors from binocular optical flows via iterative calculation.

In an experiment, a module of Shenzhou spacecraft is used as a target, and feature points on a solar panel of the module are used as tracking points. FIG. 11 illustrates a left image and a right image out of image sequences of a scenario captured by binocular cameras, and binocular optical flows are generated by coordinates of feature points extracted from image sequences of the scenario in left and right image pairs. FIGS. 12A and 12B illustrate optical flows generated by the moving target on the binocular cameras, where areas ineffective for reconstruction are marked out. Three-dimensional motion vectors of the target reconstructed by binocular optical flows containing areas ineffective for reconstruction are shown in FIG. 13, where obvious inflections occur in trajectory segments reconstructed by the areas. Variation of X, Y and Z components of intersections among motion vectors of the reconstructed trajectory is analyzed in FIG. 14 and it can be concluded that comparatively small difference of an optical flow in a direction U or V results in comparatively large error. Referring to ellipse-marked areas in FIGS. 12A and 12B, each of the optical flow segments has no difference in the direction V, and X, Y and Z components thereof are 0. Three-dimensional motion vectors of the target reconstructed by effective area-constrained binocular optical flows after removing areas ineffective for reconstruction are shown in FIG. 15, and a trajectory reconstructed by removing areas with comparatively large errors from binocular optical flows via iterative calculation is shown in FIG. 16.

Figure 17A:
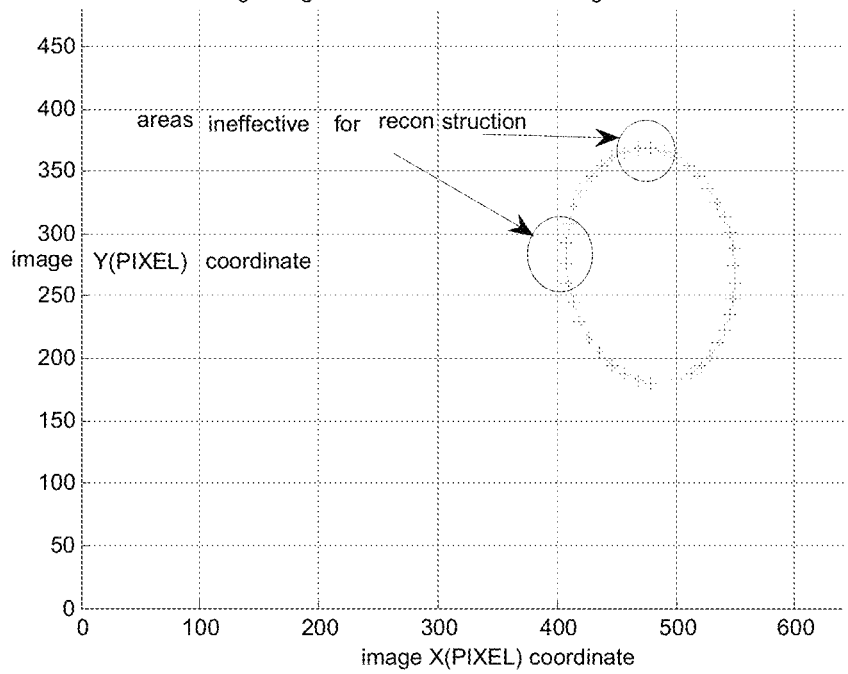
FIGS. 17A and 17B illustrate optical flows obtained by image sequences of a rotational target captured by a stereo camera and multiple areas ineffective for reconstruction thereof.
Figure 17B:
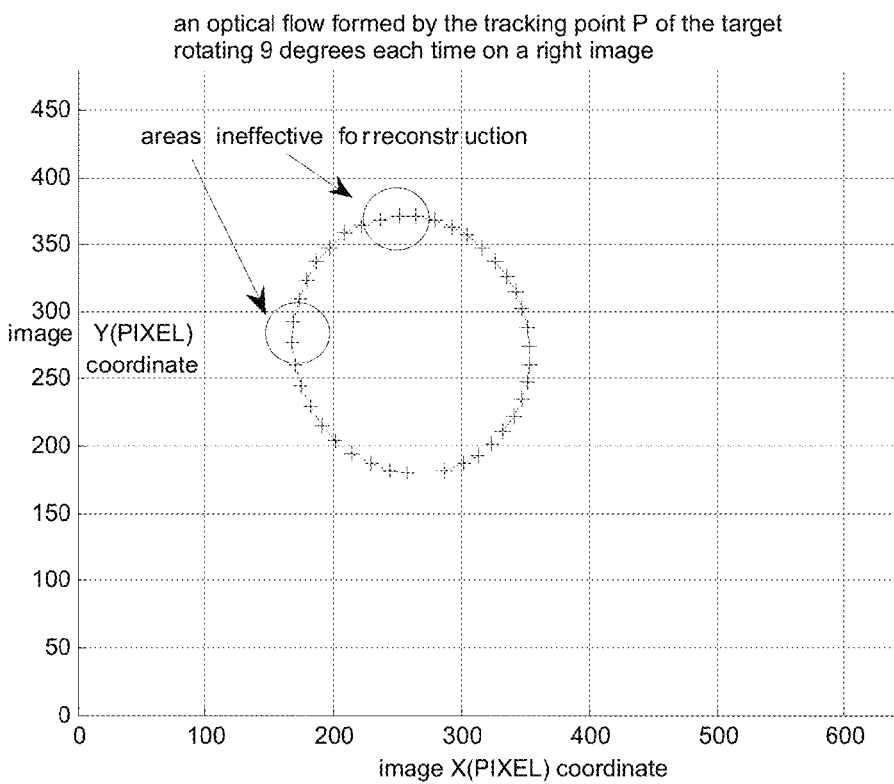
Figure 18:
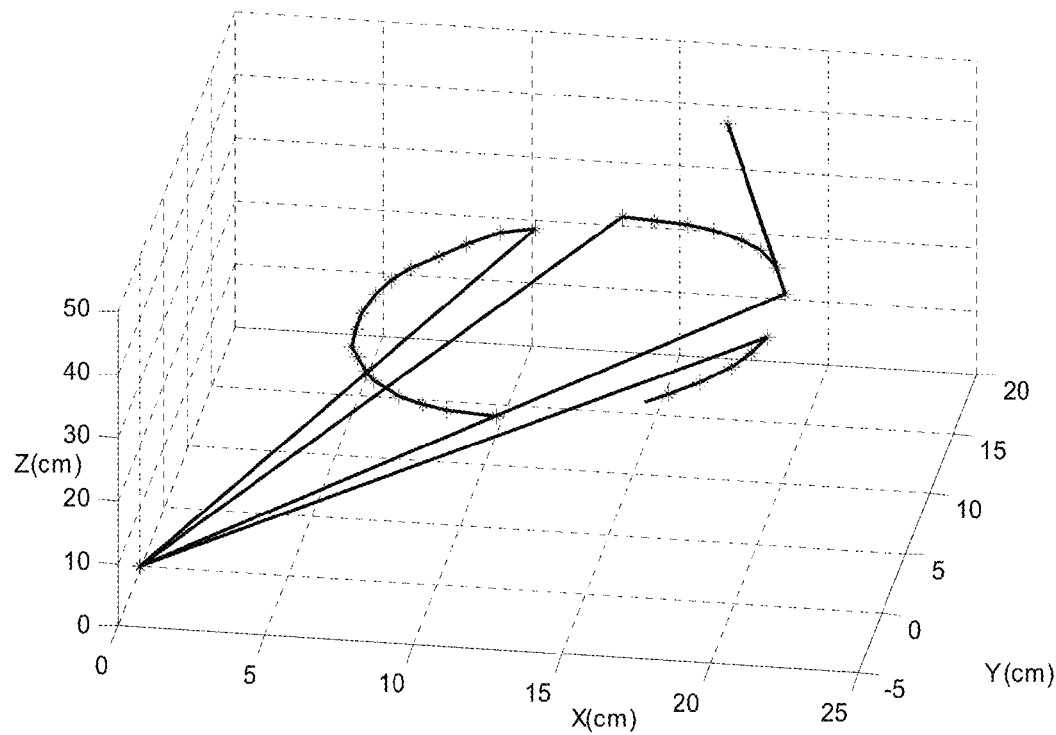
FIG. 18 illustrates a schematic diagram of motion vectors of a three-dimensional movement trajectory of the target reconstructed by binocular optical flows containing areas ineffective for reconstruction thereof.
Figure 19:
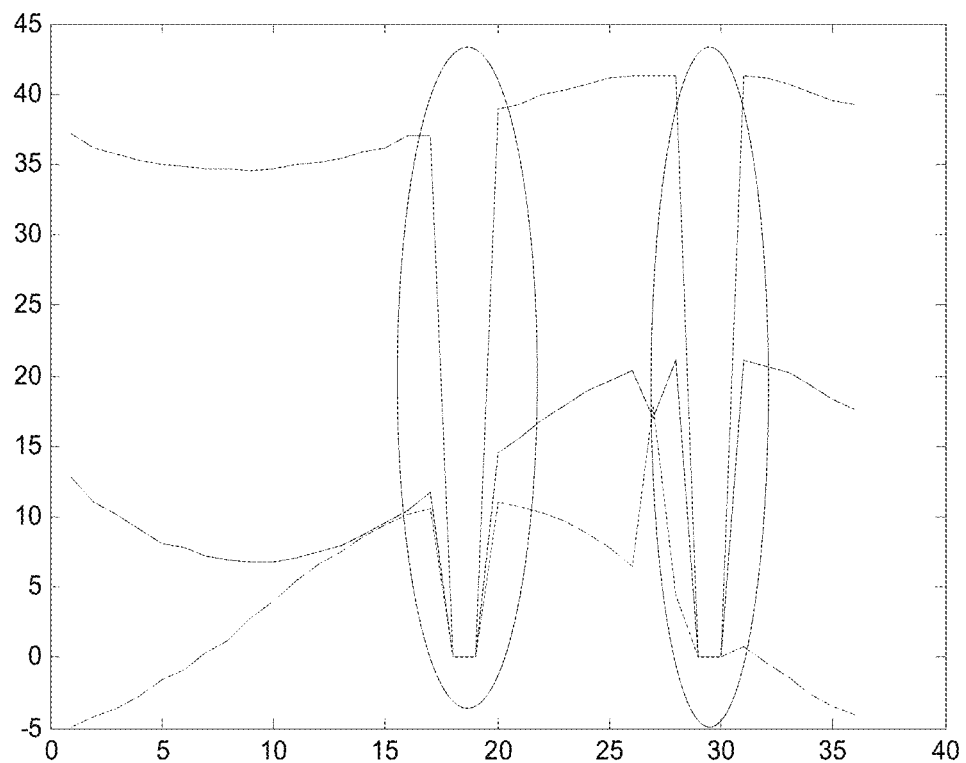
FIG. 19 illustrates an analytical schematic diagram of X, Y and Z components of a trajectory reconstructed by binocular optical flows containing multiple areas ineffective for reconstruction.
Figure 20:
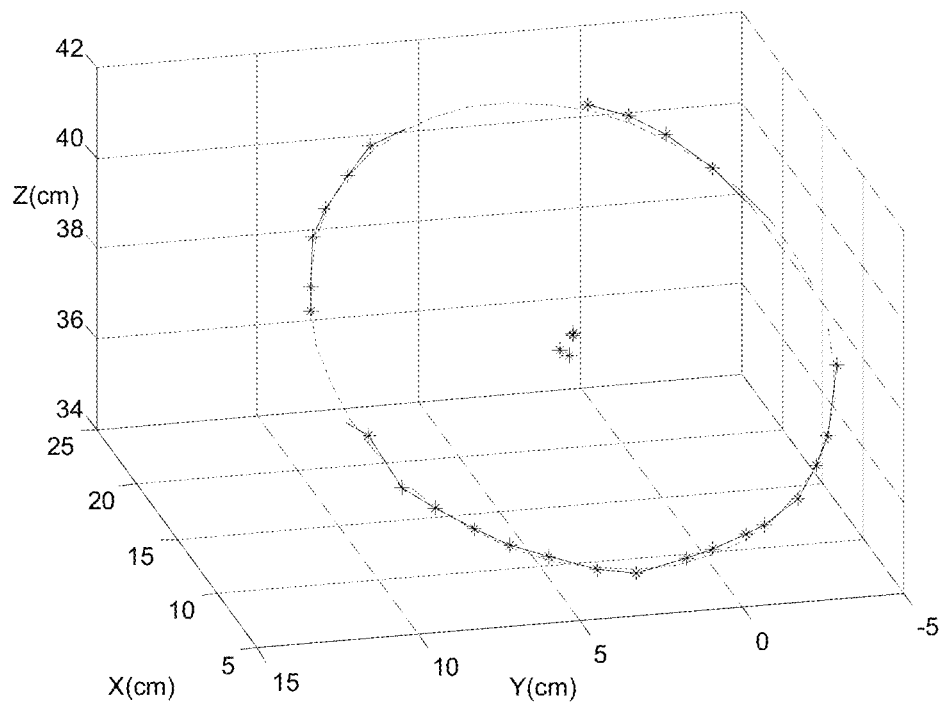
FIG. 20 illustrates a schematic diagram of a trajectory reconstructed by removing areas ineffective for reconstruction or with comparatively large errors from binocular optical flows via iterative calculation.
Figure 21:
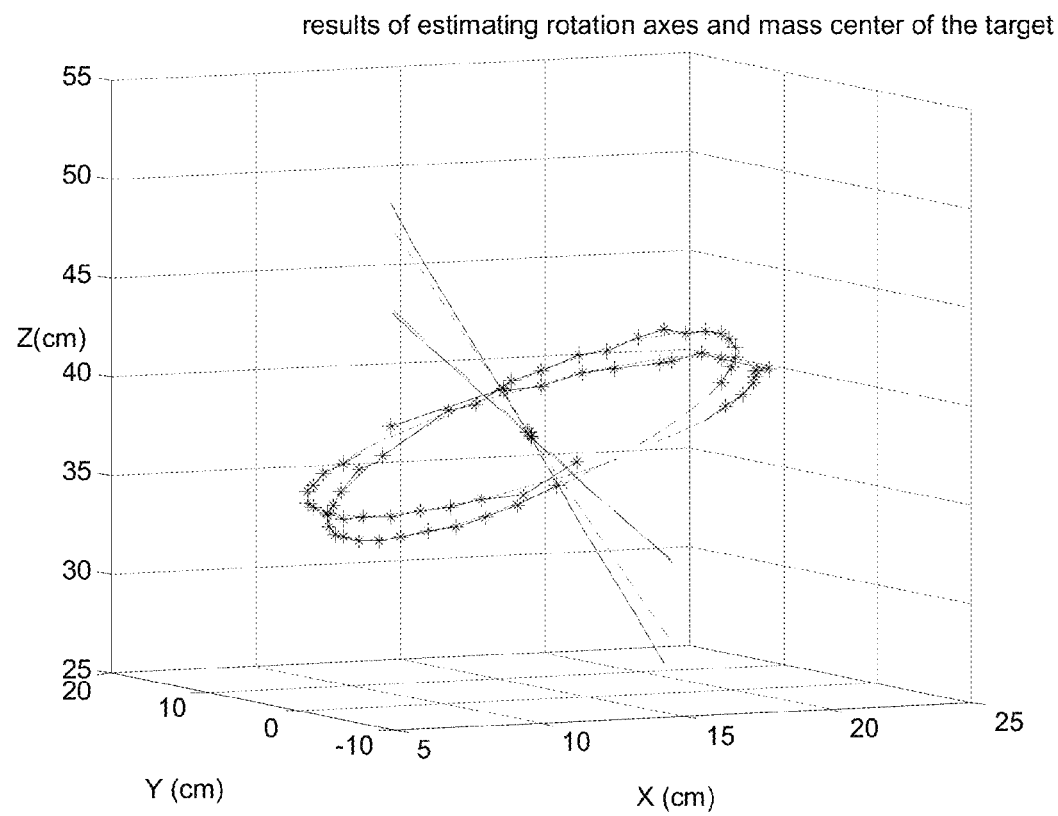
FIG. 21 illustrates results of estimating rotation axes and mass center of the target.

Considering multiple areas ineffective for reconstructing three-dimensional motion vectors may exist in binocular optical flows, a situation of dead areas existing in the directions U and V is analyzed (as shown in FIGS. 17A and 17B), where optical flow segments with no difference exist in both directions. Three-dimensional motion vectors reconstructed by areas ineffective for reconstructing three-dimensional motion vectors in binocular optical flows deviate significantly (as shown in FIG. 18). FIG. 19 illustrates X, Y and Z components of a trajectory reconstructed by binocular optical flows containing multiple areas ineffective for reconstruction, FIG. 20 illustrates a trajectory reconstructed by removing areas ineffective for reconstruction or with comparatively large errors from binocular optical flows via iterative calculation, and FIG. 21 illustrates reconstructed trajectories of the target rotating around two rotation axes, real trajectories, estimated rotation axes, real axes, a mass center of the spatial target calculated by the two estimated rotation axes and a real mass center thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for estimating a rotation axis and a mass center of a spatial target based on binocular optical flows, the method comprising:
   (1) extracting feature points from a stereo image pair respectively;
   (2) calculating binocular optical flows formed by feature points in image sequences sequentially;
   (3) removing areas ineffective for reconstructing a three-dimensional movement trajectory from the binocular optical flows of the feature points, thereby obtaining effective area-constrained binocular optical flows;
   (4) reconstructing a three-dimensional movement trajectory of each of the feature points according to the effective area-constrained binocular optical flows thereof obtained in step (3);
   (5) calculating a normal vector of a three-dimensional movement trajectory plane of each of the feature points, calculating a cosine distance between the normal vector of each of the feature points and a direction vector of each segment of the trajectory thereof sequentially, and removing a segment of the trajectory of each of the feature points with a maximum modulus of cosine distance;
   (6) recalculating a normal vector of a trajectory plane of each of the feature points according to the residual trajectory thereof, calculating a cosine distance between the two normal vectors of each of the feature points, determining whether the cosine distance between the two normal vectors of each of the feature points is greater than a preset cosine distance threshold, and returning to step (5) and performing calculation according to the residual trajectory of each of the feature points if yes;
   (7) estimating a trajectory plane of each of the feature points and center and radius of the trajectory thereof;
   (8) performing weighted average on normal vectors of the trajectory planes and on centers of the trajectories respectively according to the radius of the trajectory of each of the feature points, whereby obtaining a spatial equation of a final rotation axis; and
   (9) repeating steps (1)-(8) when the rotation axis of the spatial target changes, whereby obtaining a spatial equation of a second rotation axis, and combining the spatial equation of the second rotation axis with that of the former rotation axis, whereby calculating coordinate of mass center of the spatial target.

2. The method of claim 1, wherein in step (3), said process of removing areas ineffective for reconstructing a three-dimensional movement trajectory from the binocular optical flows of the feature points further comprises:
   assuming an optical flow of a left image sequence is $P_1P'_1$, $P'_1P''_1$, $P''_1P'''_1 \ldots P_1^{(n-1)}P_2^{(n)}$ and an optical flow of a right image sequence is $P_2P'_2$, $P'_2P''_2$, $P''_2P'''_2 \ldots$ $P_2^{(n-1)}P_2^{(n)}$ for a feature point P of the target, calculating difference in a direction U and a direction V respectively for each segment of the optical flows $P_1^{(i-1)}P_1^{(i)}$ and $P_2^{(i-1)}P_2^{(i)}$, where i=1, 2 ... n, and removing any segment of the optical flows $P_1^{(i-1)}P_1^{(i)}$ and $P_2^{(i-1)}P_2^{(i)}$ with a difference of 0 in the direction U or the direction V.

3. The method of claim 2, wherein in step (4), said process of reconstructing a three-dimensional movement trajectory of each of the feature points according to the effective area-constrained binocular optical flows thereof obtained in step (3) further comprises:

obtaining n segments of optical flow from a left image sequence and a right image sequence respectively for a feature point P, reconstructing n motion vectors of the feature point spinning around a rotation axis, where $P_1$ is a projection of P in a left image, $P_2$ is a projection of P in a right image, the n segments of optical flow obtained from the left image sequence is from $P_1$ to $P_1^{(n)}$, the n segments of optical flow obtained from the right image sequence is from $P_2$ to $P_2^{(n)}$, and the reconstructed n motion vectors are $\overrightarrow{PP'}$, $\overrightarrow{P'P''}$, $\overrightarrow{P''P'''}$ ... $\overrightarrow{P_{(n-1)}P^{(n)}}$, and obtaining a three-dimensional movement trajectory of the feature point, where an equation of a motion vector $\overrightarrow{P^{(i-1)}P^{(i)}}$ in a spatial coordinate system is as follows:

$$\begin{cases} x = az + p \\ y = bz + q, \end{cases} (q \neq 0), \text{ where}$$

i = 1, 2 ... n and $$\begin{cases} a = (m_2 f_{x1} - m_1 f_{x2})/(k_1 f_{x2} f_{y1} - k_2 f_{x1} f_{y2}) \\ b = (m_2 f_{x1} - m_1 f_{x2})/(k_1, f_{x2}, f_{y1} - k_2 f_{x1} f_{y2}) \\ p = k_1 b_0 f_{x2} f_{y1}/(k_1 f_{x2} f_{y1} - k_2 f_{x1} f_{y2}) \\ q = b_0 f_{x1} f_{x2}/(k_1 f_{x2} f_{y1} - k_2 f_{x1} f_{y2}) \end{cases},$$

where $b_0$ is a baseline length between a left camera and a right camera, $f_{x1}$ and $f_{y1}$ are equivalent focal lengths of the left camera in a direction X and a direction Y respectively, $f_{x2}$ and $f_{y2}$ are equivalent focal lengths of the right camera in the direction X and the direction Y respectively, $k_1$ and $m_1$ are slope and intercept of a line $l_1$ passing through a segment of optical flow $\overrightarrow{P_1^{(i-1)}P_1^{(i)}}$ of the feature point P formed on an imaging plane of the left camera respectively, and $k_2$ and $m_2$ are slope and intercept of a line $l_2$ passing through a segment of optical flow $\overrightarrow{P_2^{(i-1)}P_2^{(i)}}$ of the feature point P formed on an imaging plane of the right camera respectively.

4. The method of claim 3, wherein step (5) further comprises:

calculating a normal vector $\overrightarrow{w_t} = (w_{tx}, w_{ty}, w_{tz})^T$ of a current optical flow trajectory plane of each of the feature points according to three-dimensional motion vectors $\overrightarrow{PP'}$, $\overrightarrow{P'P''}$, $\overrightarrow{P''P'''}$ ... $\overrightarrow{P_{(n-1)}P^{(n)}}$, thereof obtained in step (4), where the direction of each motion vector is $\overrightarrow{w_i} = (a, b, 1)$, and i=1, 2 ... n;

calculating a cosine distance $\cos(\theta_i)$ between each of the motion vectors of each of the feature points and the normal vector of the optical flow trajectory plane thereof, where $$\cos(\theta_i) = \frac{\overrightarrow{w_t}^T \cdot \overrightarrow{w_i}}{|\overrightarrow{w_t}||\overrightarrow{w_i}|}$$

and i=1, 2 ... n; and removing a segment of binocular optical flows of the feature points with a maximum modulus of cosine distance, and obtaining residual k−1 segments of binocular optical flows for each of the feature points.

5. The method of claim 4, wherein step (6) further comprises:

recalculating a normal vector $\overrightarrow{w'_t} = (w'_{tx}, w'_{ty}, w'_{tz})^T$ according to the k−1 segments of binocular optical flows for each of the feature points, calculating a cosine distance $$\cos(\alpha) = \frac{\overrightarrow{w_t}^T \cdot \overrightarrow{w'_t}}{|\overrightarrow{w_t}||\overrightarrow{w'_t}|}$$

between the two normal vectors, and returning to step (5) and performing calculation according to the residual trajectory of each of the feature points if the cosine distance between the two normal vectors is greater than a preset cosine distance threshold.

6. The method of claim 5, wherein in step (7), $(x_O, y_O, z_O)^T$ represents center coordinate of the trajectory of each of the feature points and is calculated by the following equation:

$$\begin{bmatrix} Q_1 & Q_9 - Q_4 & -(Q_5 + Q_8) \\ -(Q_9 + Q_4) & Q_2 & Q_7 - Q_6 \\ Q_8 - Q_5 & -(Q_6 + Q_7) & Q_3 \end{bmatrix} \cdot \begin{bmatrix} x_0 \\ y_0 \\ z_0 \end{bmatrix} = \begin{bmatrix} Q_{10} \\ Q_{11} \\ Q_{12} \end{bmatrix},$$

$\overrightarrow{\omega'} = (\omega'_x, \omega'_y, \omega'_z)^T$ represents normal vector direction of the trajectory of each of the feature points and is calculated by the following equation:

$\omega'_x : \omega'_y : \omega'_z = Q_7 : Q_8 : Q_9$, and

R' represents a radius of the trajectory of each of the feature points and is calculated by the following equation:

$$R' = \frac{|(x_o - x_A, y_o - y_A, z_o - z_A) \times (x, y, z)|}{\sqrt{x^2 + y^2 + z^2}},$$

where $Q_1 = (1 - \cos \Omega t)(1 - \omega'^2_x)$, $Q_2 = (1 - \cos \Omega t)(1 - \omega'^2_y)$, $Q_3 = (1 - \cos \Omega t)(1 - \omega'^2_z)$, $Q_4 = (1 - \cos \Omega t)\omega'_x \omega'_y$, $Q_5 = (1 - \cos \Omega t)\omega'_x \omega'_z$, $Q_6 = (1 - \cos \Omega t)\omega'_y \omega'_z$, $Q_7 = \omega'_x \sin \Omega t$, $Q_8 = \omega'_y \sin \Omega t$, $Q_9 = \omega'_z \sin \Omega t$, $Q_{10} = x_0 Q_1 y_0 Q_4 - z_0 Q_5 - z_0 Q_8 + y_0 Q_9$, $Q_{11} = y_0 Q_2 - x_0 Q_4 - z_0 Q_6 + z_0 Q_7 - x_0 Q_9$, $Q_{12} = z_0 Q_3 - x_0 Q_5 - y_0 Q_6 - y_0 Q_7 + x_0 Q_8$, $(x_A, y_A, z_A)^T$ represents a coordinate of a starting point of the trajectory of the feature point, $(x,y,z)^T$ represents an optical flow corresponding to the trajectory of the feature point, and $\Omega$ is modulus of a rotational angular velocity vector $\vec{\omega}$ of the target.

7. The method of claim 6, wherein in step (8), a final center coordinate $(\bar{x}, \bar{y}, \bar{z})$ and a final normal direction $\{\bar{a}, \bar{b}, \bar{c}\}$ are calculated by the following equations:

$$\bar{x} = \sum_{i=1}^{n} \left( \frac{r_i x_i}{\sum_{j=1}^{n} r_j} \right), \bar{y} = \sum_{i=1}^{n} \left( \frac{r_i y_i}{\sum_{j=1}^{n} r_j} \right), \bar{z} = \sum_{i=1}^{n} \left( \frac{r_i z_i}{\sum_{j=1}^{n} r_j} \right),$$

$$\bar{a} = \sum_{i=1}^{n} \left( \frac{r_i a_i}{\sum_{j=1}^{n} r_j} \right), \bar{b} = \sum_{i=1}^{n} \left( \frac{r_i b_i}{\sum_{j=1}^{n} r_j} \right), \text{ and } \bar{c} = \sum_{i=1}^{n} \left( \frac{r_i c_i}{\sum_{j=1}^{n} r_j} \right),$$

and the equation of the final rotation axis is as follows:

$$\frac{x - \bar{x}}{\bar{a}} = \frac{y - \bar{y}}{\bar{b}} = \frac{z - \bar{z}}{\bar{c}},$$

where center coordinate of the trajectory of the ith feature point is represented by $(x_i, y_i, z_i)$, radius thereof is represented by $r_i$, normal direction of the trajectory plane is represented by $(a_i, b_i, c_i)$, and i=1, 2 . . . n.

\* \* \* \* \*